United States Patent
Guo et al.

(10) Patent No.: US 8,505,281 B2
(45) Date of Patent: Aug. 13, 2013

(54) TECHNIQUES FOR ENHANCING AFTERTREATMENT REGENERATION CAPABILITY

(75) Inventors: Linsong Guo, Columbus, IN (US); Ryan Edgecomb, Columbus, IN (US); Robert Kern, Indianapolis, IN (US); Lk Hwang, Columbus, IN (US); Timothy R. Frazier, Columbus, IN (US); Neal W. Currier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 450 days.

(21) Appl. No.: 12/894,638

(22) Filed: Sep. 30, 2010

(65) Prior Publication Data
US 2011/0139136 A1    Jun. 16, 2011

Related U.S. Application Data

(60) Provisional application No. 61/247,289, filed on Sep. 30, 2009, provisional application No. 61/247,773, filed on Oct. 1, 2009.

(51) Int. Cl.
*F01N 3/24* (2006.01)
*F01N 3/20* (2006.01)
*F02D 23/02* (2006.01)

(52) U.S. Cl.
USPC ............ 60/286; 60/285; 60/295; 60/602

(58) Field of Classification Search
USPC .............. 60/280, 285, 286, 295, 600, 601, 60/602
See application file for complete search history.

(56) References Cited

U.S. PATENT DOCUMENTS

| 4,128,997 | A  | 12/1978 | Suzuki |
| 4,446,830 | A  | 5/1984  | Simko et al. |
| 5,953,908 | A  | 9/1999  | Appleby |
| 6,188,944 | B1 | 2/2001  | Kolmanovsky et al. |
| 6,276,139 | B1 | 8/2001  | Moraal et al. |
| 6,304,815 | B1 | 10/2001 | Moraal et al. |

(Continued)

FOREIGN PATENT DOCUMENTS

| EP | 0826869 A2 | 3/1998 |
| EP | 0915244 A2 | 5/1999 |

(Continued)

OTHER PUBLICATIONS

International Search Report and Written Opinion, PCT/US2010/050951, Cummins Inc., International Search Authority/KR, Jun. 14, 2011.

*Primary Examiner* — Thomas Denion
*Assistant Examiner* — Dapinder Singh
(74) *Attorney, Agent, or Firm* — Krieg DeVault LLP

(57) ABSTRACT

A system is provided for enhancing aftertreatment regeneration capability. The system includes an internal combustion engine producing an exhaust gas stream and an aftertreatment component that treats the exhaust gas stream, where the aftertreatment component includes a desired inlet exhaust gas temperature. The system includes an exhaust gas pressure device that modulates an exhaust pressure value, and a fuel injection system that provides a post-injection event. The system includes a controller that provides an exhaust pressure command and a fuel injection command in response to determining that a temperature of the exhaust gas stream is lower than the desired inlet exhaust gas temperature. The exhaust gas pressure device is responsive to the exhaust pressure command and the fuel injection system is responsive to the fuel injection command.

25 Claims, 11 Drawing Sheets

(56) References Cited

U.S. PATENT DOCUMENTS

| | | |
|---|---|---|
| 6,314,735 B1 | 11/2001 | Kolmanovsky et al. |
| 6,491,016 B1 | 12/2002 | Buratti |
| 6,594,990 B2 | 7/2003 | Kuenstler et al. |
| 6,609,372 B2 * | 8/2003 | Maddock et al. ............... 60/602 |
| 6,655,130 B1 | 12/2003 | Kirwan et al. |
| 6,666,020 B2 | 12/2003 | Tonetti et al. |
| 6,738,702 B2 | 5/2004 | Kolmanovsky et al. |
| 6,817,174 B1 * | 11/2004 | Igarashi et al. ................. 60/295 |
| 6,843,053 B2 | 1/2005 | Draper et al. |
| 6,848,414 B2 | 2/2005 | West et al. |
| 6,862,881 B1 | 3/2005 | Klingbeil et al. |
| 6,866,610 B2 | 3/2005 | Ito |
| 6,871,489 B2 | 3/2005 | Tumati et al. |
| 6,898,508 B2 | 5/2005 | Nakano et al. |
| 6,901,751 B2 | 6/2005 | Bunting et al. |
| 6,910,329 B2 | 6/2005 | Bunting et al. |
| 6,925,802 B2 | 8/2005 | Arnold |
| 6,935,100 B2 | 8/2005 | Miura |
| 6,935,104 B2 * | 8/2005 | Kawatani et al. ............... 60/286 |
| 6,935,303 B2 | 8/2005 | Eismark et al. |
| 6,948,476 B2 | 9/2005 | Gioannini et al. |
| 6,951,100 B2 | 10/2005 | Kuboshima et al. |
| 6,952,919 B2 | 10/2005 | Otake et al. |
| 6,959,541 B2 | 11/2005 | Kosaka et al. |
| 6,971,970 B2 | 12/2005 | Inoue et al. |
| 6,976,353 B2 | 12/2005 | Daniel et al. |
| 6,978,603 B2 | 12/2005 | Asanuma |
| 6,988,361 B2 | 1/2006 | Van Nieuwstadt et al. |
| 7,044,118 B2 | 5/2006 | Tonetti et al. |
| 7,063,642 B1 | 6/2006 | Hu et al. |
| 7,093,428 B2 | 8/2006 | LaBarge et al. |
| 7,131,264 B2 | 11/2006 | Weissman et al. |
| 7,140,345 B2 | 11/2006 | Gioannini et al. |
| 7,150,151 B2 | 12/2006 | Mulloy et al. |
| 7,155,334 B1 | 12/2006 | Stewart et al. |
| 7,207,176 B2 | 4/2007 | Mulloy et al. |
| 7,213,565 B2 | 5/2007 | Grunaug et al. |
| 7,254,941 B2 | 8/2007 | Okugawa et al. |
| 7,263,825 B1 | 9/2007 | Wills et al. |
| 7,305,825 B2 * | 12/2007 | Ruiz et al. ....................... 60/602 |
| 7,313,913 B2 | 1/2008 | Okugawa et al. |
| 7,328,577 B2 | 2/2008 | Stewart et al. |
| 7,340,885 B2 | 3/2008 | Colignon |
| 7,370,632 B2 | 5/2008 | Colignon |
| 7,386,977 B2 | 6/2008 | Ancimer et al. |
| 7,435,275 B2 | 10/2008 | Simpkins et al. |
| 7,435,400 B2 | 10/2008 | Zauderer |
| 7,484,503 B2 | 2/2009 | Wyatt et al. |
| 7,617,686 B2 * | 11/2009 | Lilley et al. ..................... 60/772 |
| 8,051,644 B2 * | 11/2011 | Gonze et al. .................... 60/286 |
| 8,322,129 B2 * | 12/2012 | Dollmeyer et al. ............. 60/280 |
| 2004/0031262 A1 * | 2/2004 | Gui et al. ......................... 60/285 |
| 2004/0096372 A1 * | 5/2004 | Minami ........................ 422/171 |
| 2006/0016424 A1 | 1/2006 | Gioannini et al. |
| 2006/0277898 A1 | 12/2006 | McCarthy, Jr. |
| 2007/0000238 A1 | 1/2007 | Marlett et al. |
| 2007/0130922 A1 | 6/2007 | Dye et al. |
| 2007/0130923 A1 | 6/2007 | Dye et al. |
| 2008/0010971 A1 | 1/2008 | Gioannini et al. |
| 2008/0022655 A1 | 1/2008 | Forthmann et al. |
| 2008/0078167 A1 | 4/2008 | Wang et al. |
| 2008/0148719 A1 | 6/2008 | Hermansson et al. |
| 2008/0307772 A1 | 12/2008 | Kawamura et al. |
| 2009/0266055 A1 | 10/2009 | Guo et al. |

FOREIGN PATENT DOCUMENTS

| | | |
|---|---|---|
| EP | 1058035 A2 | 12/2000 |
| EP | 1348857 A2 | 10/2003 |
| EP | 1437492 A1 | 7/2004 |
| EP | 1653069 A1 | 5/2006 |
| EP | 1669580 A1 | 6/2006 |
| EP | 1582707 B1 | 1/2007 |
| EP | 1915842 A2 | 4/2008 |
| EP | 1918541 A1 | 5/2008 |
| EP | 1965059 A1 | 9/2008 |
| EP | 1965065 A1 | 9/2008 |
| JP | 11-117729 A | 4/1999 |
| KR | 10-2008-0031986 A | 4/2008 |
| WO | WO 2008/103112 A1 | 8/2008 |
| WO | WO 2010/014202 A2 | 2/2010 |

* cited by examiner

TECHNIQUES FOR ENHANCING AFTERTREATMENT REGENERATION CAPABILITY

CROSS REFERENCE TO RELATED APPLICATIONS

The present application claims the benefit of U.S. Provisional Patent Application 61/247,289 filed Sep. 30, 2009, and to U.S. Provisional Patent Application 61/247,773 filed Oct. 1, 2009, both of which are incorporated herein by reference.

BACKGROUND

The technical field relates generally to $NO_x$ control in internal combustion engines, and more particularly relates to $NO_x$ control in reciprocating piston engines with common rail fuel injection. Modern internal combustion engines must meet stringent emissions standards, including a maximum amount of nitrogen oxides ($NO_x$) that may be emitted. Many engines now utilize aftertreatment systems to reduce engine-out emissions to regulatory levels before release to the atmosphere. The process of regenerating the aftertreatment systems often introduces an increased emissions burden on the system, especially when regenerating certain types of aftertreatment components such as a diesel particulate filter (DPF) or $NO_x$ adsorber. Any increase of emissions during a regeneration event must be accounted for in the total emissions of the engine. Accordingly, there is a demand for further improvements in this area of technology.

SUMMARY

One embodiment is a unique fuel injection technique shifting at least a portion of the combustion fuel for injection to a later crank angle degree to reduce $NO_x$ generation during an aftertreatment regeneration event, and coordinating EGR and VGT operations to support regeneration of an aftertreatment component. Further embodiments, forms, objects, features, advantages, aspects, and benefits shall become apparent from the following description and drawings.

DESCRIPTION OF THE ILLUSTRATIVE EMBODIMENTS

Figure 1:
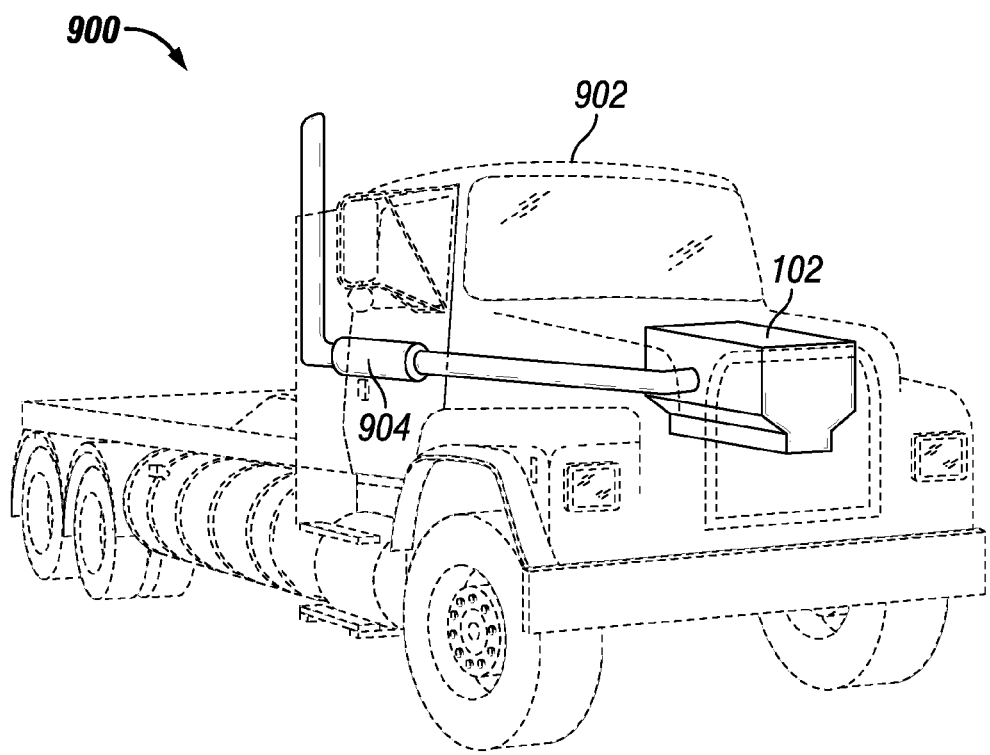
FIG. 1 is a schematic illustration of an application including an engine and aftertreatment system.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

FIG. 1 is a schematic illustration of an application 900 including a vehicle 902 that carries an internal combustion engine 102 having one or more reciprocating pistons. The application 900 includes an aftertreatment system 904 that requires periodic regeneration events. The engine 102 includes fuel injectors and a processing subsystem that controls the fuel injectors and the power output of the engine 102. The application 900 serves as an exemplary platform for the presently described systems, methods, and apparatuses to reduce $NO_x$ emissions and generate temperature and other exhaust conditions to assist in regenerating the aftertreatment system 904. The particular features illustrated in FIG. 1 are well known.

The aftertreatment system 904 includes one or more aftertreatment components that have catalytic activity that benefits from certain adjustments to the exhaust environment, and/or that require periodic regeneration events to clear soot or to renew the catalytic activity. Exemplary aftertreatment components include soot filters, catalyzed soot filters, $NO_x$ adsorbers, SCR catalyst components, and/or oxidation catalysts. Exemplary, non-limiting regeneration events include oxidizing soot from a soot filter, desorbing $NO_x$ from a $NO_x$ adsorber through rich and/or high temperature exhaust operation, clearing adsorbed $NH_3$ on an SCR catalyst, and/or driving sulfur from a catalyst utilizing temperature.

Figure 2:
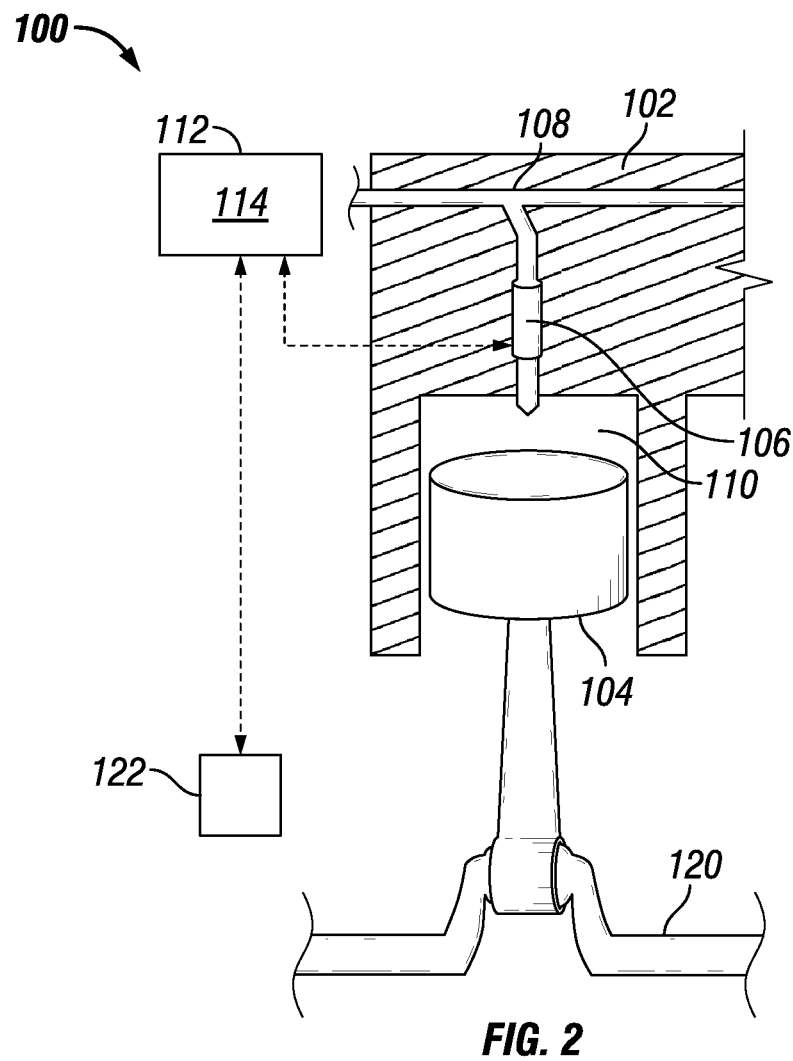
FIG. 2 is a schematic illustration of a system for reducing $NO_x$ emissions.

FIG. 2 is a schematic block diagram of a system 100 for reducing $NO_x$ emissions. The system 100 includes an engine 102 having one or more reciprocating pistons 104. The engine 102 includes a fuel injector 106 capable of performing multiple fuel injection events to a combustion chamber 110 per one or two rotations of a crankshaft 120. For example, the fuel injector 106 in certain embodiments receives fuel from a pressurized common rail 108. While the engine 102 illustrated in FIG. 1 includes a high pressure common rail fuel injection system, the present application contemplates any apparatus capable of delivering multiple fuel injection events to the combustion chamber 110 of an engine 102 per rotation (or per two rotations) of the crankshaft 120. In certain embodiments, the system 100 includes an engine position sensor 122 that detects a current crankshaft 120 position. In certain further embodiments, certain techniques described herein to reduce $NO_x$, increase exhaust temperature, and/or to improve the regeneration environment for the aftertreatment system 904 do not utilize post-injection events and the fuel system of the engine 102 does not require multiple fuel injection event capability.

The system 100 further includes a processing subsystem 112 including a controller 114 structured to perform certain operations for reducing NOx during aftertreatment regeneration. The processing subsystem 112 may be structured with controllers, modules, sensors, actuators, communication links, and other devices known in the art for performing the operations described herein. The controller 114 may be a single device or a distributed device, and the functions of the controller may be performed by hardware or software. All commands and information may be provided in alternate forms, some information may not be present in certain embodiments, and additional information may be present in certain embodiments. Information may be interpreted from sensor inputs, from datalink communications, from parameters on a storage medium readable by a computer, or through other information gathering devices understood in the art.

Figure 3:
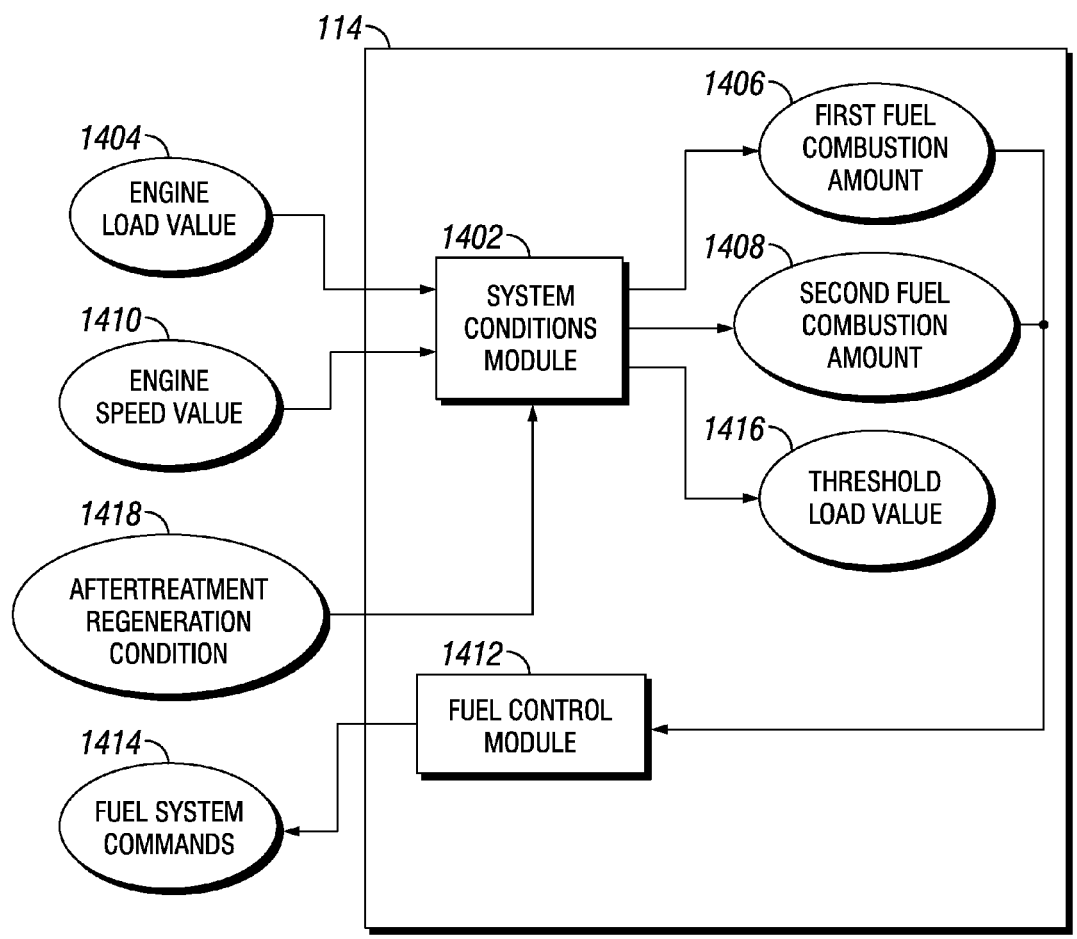
FIG. 3 is a schematic block diagram of a controller for reducing $NO_x$ emissions.

In certain embodiments, the controller includes one or more modules structured to functionally execute the operations of the controller. In certain embodiments, the controller includes an. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 3.

In certain embodiments, the controller 114 includes a system conditions module 1402 that interprets an engine load value 1404, and determines a first fuel combustion amount 1406 and a second combustion amount 1408 in response to the engine load value 1404. In certain further embodiments, the system conditions module 1402 interprets an aftertreatment regeneration condition 1418, and further determines the first fuel combustion amount 1406 and the second fuel combustion amount 1408 in response to the aftertreatment regeneration condition 1418. Exemplary operations utilizing the aftertreatment regeneration condition 1418 include determining that an aftertreatment component requires a regeneration, is close to requiring a regeneration, is currently regenerating (either actively due to intentional system operations or passively due to conditions present in the exhaust system), and/or an ongoing regeneration of the aftertreatment component has stalled or delayed. Where the system conditions module 1402 is not determining the first fuel combustion amount 1406 and the second fuel combustion amount 1408, a fuel control module 1412 provides unmodified fuel system commands 1414 according to normal operations of the system.

An exemplary engine load value 1404 includes a requested engine torque output, and the system conditions module 1402 determines a first fuel combustion amount 1406 and a second combustion amount 1408 such that the requested engine torque output is achieved. The system conditions module 1402 may further determine a current engine speed value 1401, and further determine the first fuel combustion amount 1406 and second fuel combustion amount 1408 in response to the current engine speed value 1410. For example, the engine load value 1404 may be a requested engine horsepower output, and the system conditions module 1402 determines a first fuel combustion amount 1406 and a second fuel combustion amount 1408 such that the requested engine horsepower output is achieved, taking into account the current speed of the engine 1410. In certain embodiments, the engine load value 1404 is a value describing a percentage of a current maximum available torque value represented by a current requested engine torque. A maximum available torque value may be an overall maximum torque value or a maximum torque value at the current engine speed value 1410. Any value understood in the art as an engine load value is contemplated in the present application.

In certain embodiments, the controller 114 includes a fuel control module 1412 that provides fuel system commands 141 such that the first fuel combustion amount 1406 is injected as one or more main injection events, and the second fuel combustion amount 1408 is injected as one or more post-injection events. In certain embodiments, the one or more post-injection events begin before 63 degrees after top dead center (TDC). In certain embodiments, the fuel control module 1412 further determines the first fuel combustion amount as less than 60% of a combustion fuel amount, where the first fuel combustion amount 1406 and the second fuel combustion amount 1408 together include a total amount of fuel contributing to combustion and injected within a single combustion stroke. In certain embodiments, the total amount of fuel contributing to combustion include the fuel amounts that burn in the combustion chamber 110 and contribute to the torque output of the engine 102. In certain embodiments, the fuel control module 1412 provide the fuel system commands 1414 such that the fuel injector 106 delivers the first fuel combustion amount before 10 degrees after TDC of the piston 104, and delivers the second combustion amount after 10 degrees after TDC.

Depending upon the characteristics of the fuel system, the terms delivery of fuel, injection of fuel, and/or performing a fuel injection event at a specified crank angle degree indicate that the fueling event or start-of-injection (SOI) begins at the specified crank angle degree. For example, delivery before 10 degrees after TDC generally indicates an SOI before 10 degrees after TDC. However, embodiments wherein delivery before 10 degrees after TDC indicates completion of an injection event before 10 degrees after TDC are also contemplated herein except where otherwise stated. The differences between the naming conventions are small for most fuel systems.

In certain embodiments, the first fuel combustion amount 1406 comprises less than 25% of the combustion fuel amount in response to the engine load value 1404 having a value less than a threshold load value 1416, which may be a threshold percentage of a maximum engine load level. In certain embodiments, the threshold load value 1416 includes a load value between about 30% and 40% of the maximum engine load value. In certain further embodiments, the first fuel combustion amount 1406 comprises less than 50% of the combustion fuel amount in response to the engine load value being at least equal to the threshold load value 1416. For example, in certain embodiments of the system 100, the fuel injector 106 injects a low amount of fuel in a "main" injection in response to a low engine load value, and injects a greater amount of fuel, but less than 60%, in a "main" injection in response to a higher engine load value.

In certain embodiments, a first fuel injection event and a second fuel injection event are injected as approximately equal amounts of fuel. In certain further embodiments, the first fuel injection event and the second fuel injection event are injected as approximately equal amounts of fuel in response to the engine load value 1404 having a value at least equal to a threshold load value 1416. For example, if the combustion fuel amount is 100 units of fuel and the engine load value is greater than the threshold load value 1416, the first fuel combustion amount may be 30% of the combustion fuel amount and injected as a first injection event including 30 units of fuel. The second combustion amount may be 70% of the combustion fuel amount, and injected as a second injection event including 30 units of fuel, and further as one or more later injection events adding up to 40 units of fuel.

In certain further embodiments, the first injection event and the second injection event may have a ratio varying within a range of about 3:7 to 7:3, providing fueling amounts for the first:second:later injection events between about 30:70:0 units of fuel respectively to about 30:13:57 units of fuel respectively. Note that, in applicable embodiments, even if the first:second ratio is as high as 7:3, the overall percentage of fuel in the first injection event compared to the combustion fuel amount is maintained, with the balance of the fuel provided in later injection events. In certain embodiments, including any engine load values 1404, but especially at engine load values 1404 below the threshold load value 1416, there may be no relationship enforced between the amounts of the first and second fuel injection events.

In certain embodiments, each fuel injection event within the first fuel combustion amount and the second combustion amount occurs not earlier than 3 crank angle degrees after the prior fuel injection event. In certain embodiments, limitations of a fueling system may require longer delays such as between about 5 and 10 crank angle degrees between injection events. In certain further embodiments, it is desirable that the combustion event continue throughout injection of fuel for each of the fuel combustion amounts 1406, 1408, and therefore limitations of continuing the combustion event require no greater than a maximum time between fuel injection events.

In many situations, it is a straightforward matter to plot expected heat release versus observed heat release in a test cell to determine how far apart injection events may occur and still continue the combustion event. The time separation possible between events depends upon the crank angle positions of the injection events (e.g. temperature in the combustion chamber is changing more rapidly with respect to time away from TDC than near TDC), the engine speed, the engine loading value, and other factors understood in the art. Generally, injection events later than 63 degrees after TDC, which may be termed very late post injections, may exhibit some torque effects (i.e. combust partially) but generally such injections do not participate in the combustion event, and therefore generate primarily unburned hydrocarbons (UHC) rather than torque.

In certain embodiments, the controller 114 is structured to determine whether an aftertreatment (not shown) regeneration is active according to the aftertreatment regeneration condition 1418. The fuel control module 1412 implements a standard fueling scheme in response to the aftertreatment regeneration not being active. For example, the system 100 may include a particulate filter requiring periodic regeneration events. The system conditions module 1402 in the example determines whether a regeneration event of the particulate filter is active (according to the aftertreatment regeneration condition 1418), and provides the first and second combustion fuel amounts 1406, 1408 if the regeneration event is active. The fuel control module 1412 provides fuel system command 1414 according to a standard fueling scheme if the regeneration event is not active. In certain embodiments, the fuel control module 1412 utilizes the first and second combustion fuel amounts 1406, 1408 at all operating times of the engine 102. In certain embodiments, the fuel control module 1412 utilizes a greater amount of the second combustion fuel amount 1408 during an active regeneration event, and utilizes a greater amount of the first combustion fuel amount 1406 during periods where a regeneration event is not active.

Figure 4:
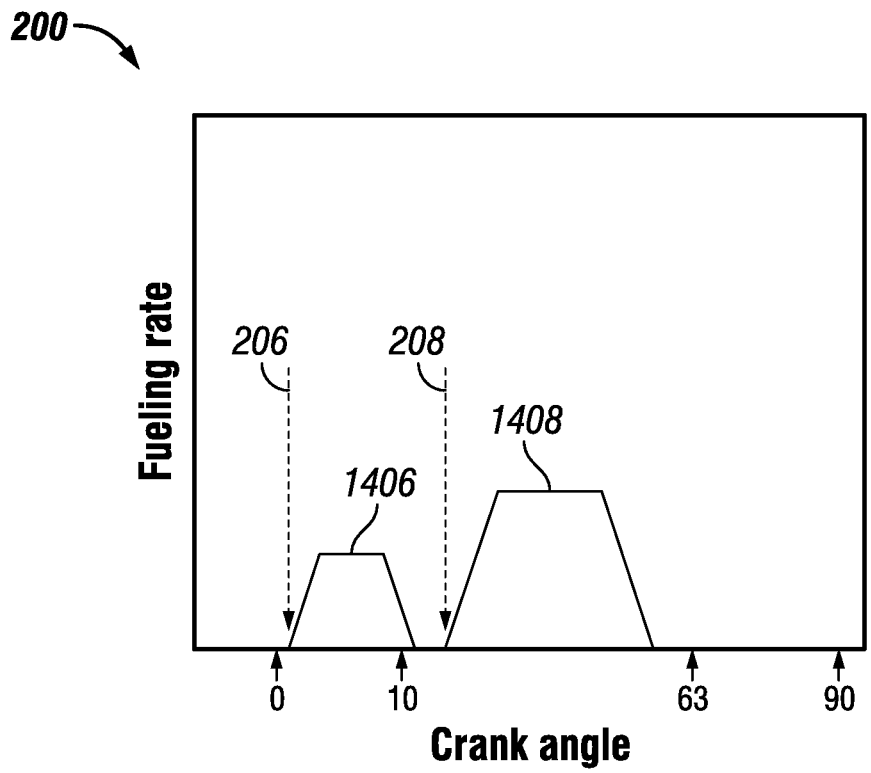
FIG. 4 is an illustration of a plurality of fuel injection events.

FIG. 4 is an illustration 200 of a plurality of fuel injection events. The illustration 200 shows a first fuel injection event 202 and a second fuel injection event 204. The amount of fuel injected during the first fuel injection event 202 comprises one, or more than one, main injection combustion fuel amounts and the amount of fuel injected during the second fuel injection event 204 comprises the one, or more than one, post injection combustion fuel amounts. In certain embodiments, the first combustion fuel amount 1406 has an SOI 206 before 10 degrees after TDC, and the second combustion fuel amount 1408 has an SOI 208 after 10 degrees after TDC, and before 63 degrees after TDC. Further, the second combustion fuel amount 1408 is larger than the first combustion fuel amount 1406.

In certain embodiments, a combustion fuel amount is divided between the first fuel injection event and the second fuel injection event. A controller 114 interprets an engine torque output request, and adjusts the combustion fuel amount based on the timing and fuel amounts of the fuel injection events 202, 204 such that the engine 102 achieves the engine torque output request. The fuel adjustment operations of the controller 114 may be utilized in any embodiments, but may be especially useful in embodiments where the second combustion fuel amounts 1408 occur in special operations of the engine 102 such as during an aftertreatment regeneration event.

For example, an engine torque output request may be 250 ft-lbs of torque, and during nominal operation of the engine 102, 100 units of fuel in the combustion fuel amount may be required to achieve the 250 ft-lbs of torque. In the example, during an aftertreatment regeneration event the controller 114 implements a first fuel combustion amount 1406 and a second fuel combustion amount 1408, and divides a portion of the combustion fuel amount into each of the first and second fuel combustion amounts 1406, 1408. The controller 114 may be further structured to calculate an effective torque according to the fuel amounts and timing of the early and second fuel combustion amounts, and to adjust the combustion fuel amount to achieve the engine torque output request. In the example, after the controller 114 puts 40 units of fuel into the first fuel combustion amount 1406 and 60 units of fuel into the second fuel combustion amount 1408, the controller 114 may determine that only 235 ft-lbs of torque will be achieved due to more of the combustion fuel amount being combusted away from TDC. The controller 114 may adjust the combustion fuel amount until 250 ft-lbs will be achieved, for example increasing the first fuel combustion amount 1406 to 42 units of fuel and the second fuel combustion amount 1408 to 64 units of fuel.

The controller 114 may adjust fueling by any method, including without limitation: proportionately across fuel injection events, favoring the first fuel combustion amount or the second fuel combustion amount, increasing one of the first fuel combustion amount or the second fuel combustion amount until a threshold is reached and putting remaining increases in the other combustion amount, or by any other fuel adjustment method understood in the art. In certain embodiments, a nominal fuel controller (not shown, but may be part of the processing subsystem 112 and/or controller 114) may be designed to account for torque effects of the timing of the first fuel combustion amount 1406 and the second fuel combustion amount 1408, and later adjustments by the controller 114 may be unnecessary.

Figure 5:
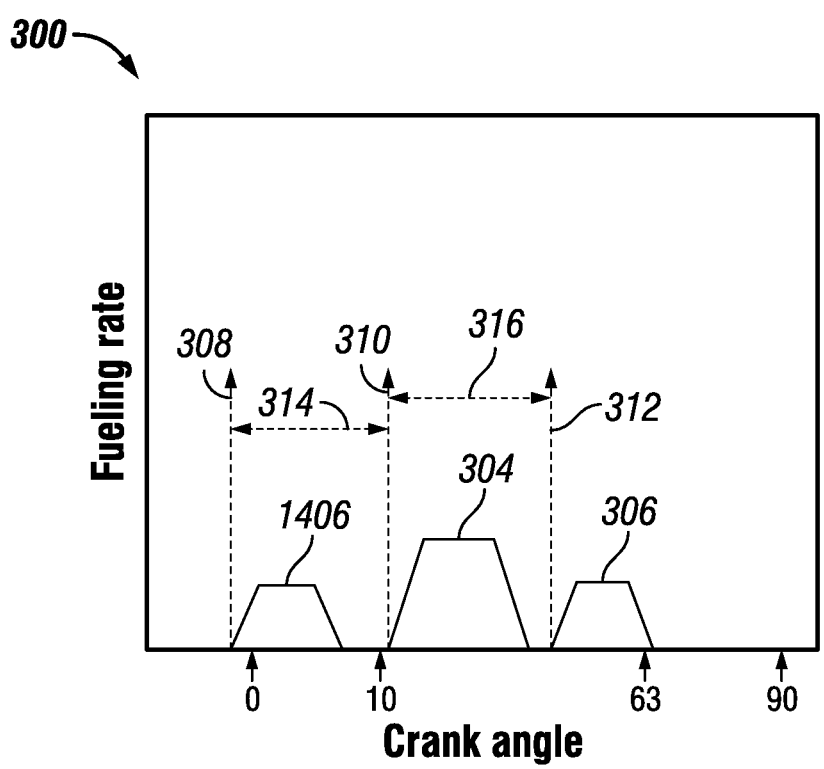
FIG. 5 is an illustration of a plurality of fuel injection events.

FIG. 5 is an illustration 300 of a plurality of fuel injection events. The illustration 300 shows a first fuel injection event 1406, a second fuel injection event 304, and a third fuel injection event 306. The amount of fuel injected during the first fuel injection event 1406 comprises the first combustion fuel amount 1406. The sum of the amounts of fuel injected in the second and third injection events 304, 306 make up the second fuel combustion amount 1408.

The first combustion fuel amount 1406 has an SOI 308 before 10 degrees after TDC. Each of the injection events 304, 306 making up the second fuel combustion amount 1408 have an SOI 310, 312 after 10 degrees after TDC and before 63 degrees after TDC. In certain embodiments, a first distance 314 between the first SOI 308 and the second SOI 310 is greater than 3 crank angle degrees. Each of the fuel injection events 302, 304, 306 contributes to combustion and is injected within a single combustion stroke. In the illustration 300 of FIG. 3, the first fuel combustion amount 1406 includes less than 25% of a combustion fuel amount, where the combustion fuel amount is the sum of the first and second fuel combustion amounts. In certain embodiments, a very late post injection event (not shown) may be included, for example to provide unburned hydrocarbons to an aftertreatment system. Very late post injections do not contribute significantly to combustion or torque generation.

Figure 6:
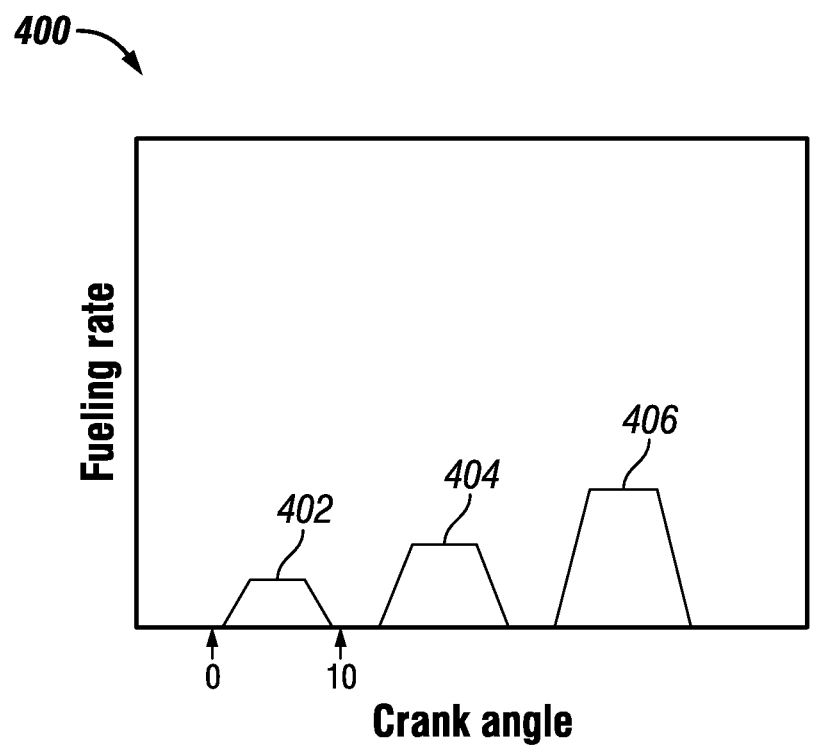
FIG. 6 is an illustration of a plurality of fuel injection events.

FIG. 6 is an illustration 400 of a plurality of fuel injection events. In certain embodiments, the system 100 performs the fuel injection events of the illustration 400 in response to determining an engine load value 1404 is less than 40% of a maximum engine load level. In the illustration 400, a first fuel injection event 402 includes less than 25% of a combustion fuel amount and has an SOI before 10 degrees after TDC, and the first fuel injection event 402 makes up the first fuel combustion amount 1406. A second fuel injection event 404 includes between 15% and 65% of the combustion fuel amount, and has an SOI after 10 degrees after TDC. A third fuel injection event 406 includes between 10% and 85% of the combustion fuel amount, and occurs at least 3 crank angle degrees after the second fuel injection event 404 and before 63 degrees after TDC. In certain embodiments, each fuel injection event 402, 404, 406 takes part in the actual combustion of the fuel, and the fuel injection events 404, 406 make up the second fuel combustion amount 1408.

Figure 7:
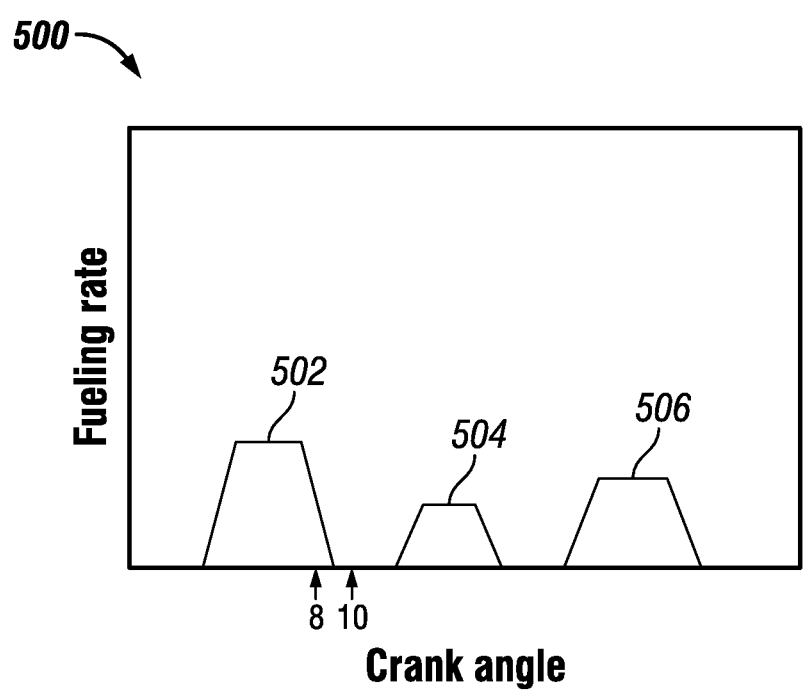
FIG. 7 is an illustration of a plurality of fuel injection events.

FIG. 7 is an illustration 500 of a plurality of fuel injection events. In certain embodiments, the system 100 performs the fuel injection events of the illustration 500 in response to determining an engine load value 1404 is at least equal to a threshold percentage (e.g. 40%) of a maximum engine load level. In certain embodiments, the fuel injection events of the illustration 500 occur on the same system 100 as the fuel injection events of the illustration 400.

For clarity in naming the fuel injection events, the fuel injection events of the illustration 400 are named a first fuel injection event 402, a second fuel injection event 404, and a third fuel injection event 406, while the fuel injection events of the illustration 500 are named a fourth fuel injection event 502, a fifth fuel injection event 504, and a sixth fuel injection event 506. However, only one set of the fuel injection events, the first-second-third fuel injection events or the fourth-fifth-sixth fuel injection events, are executed on a given combustion cycle of the engine 102 in the example. A given system 100 may include the fuel injection events of the illustration 400, the fuel injection events of the illustration 500, or both sets of fuel injection events at varying engine operating conditions. Further, certain embodiments may not include the injection events from either the illustration 400 or the illustration 500, and/or may include additional injection events not shown in the illustrations 400, 500.

In the illustration 500, a fourth fuel injection event 502 includes less than 60% of a combustion fuel amount and has an SOI before 8 degrees after TDC, and makes up the first fuel combustion amount 1406. A fifth fuel injection event 504 includes between 5% and 45% of the combustion fuel amount, and has an SOI after 10 degrees after TDC. A sixth fuel injection event 506 includes between 5% and 55% of the combustion fuel amount, and occurs at least 3 crank angle degrees after the fifth fuel injection event 504 and before 63 degrees after TDC. The fifth fuel injection event 504 and the sixth fuel injection event 506 combine to make up the second fuel combustion amount 1408. Each fuel injection event 502, 504, 506 takes part in the combustion of the fuel and in torque generation. In certain embodiments, the fifth fuel injection event 504 occurs not later than 2.8 milliseconds after the fourth fuel injection event.

Figure 9:
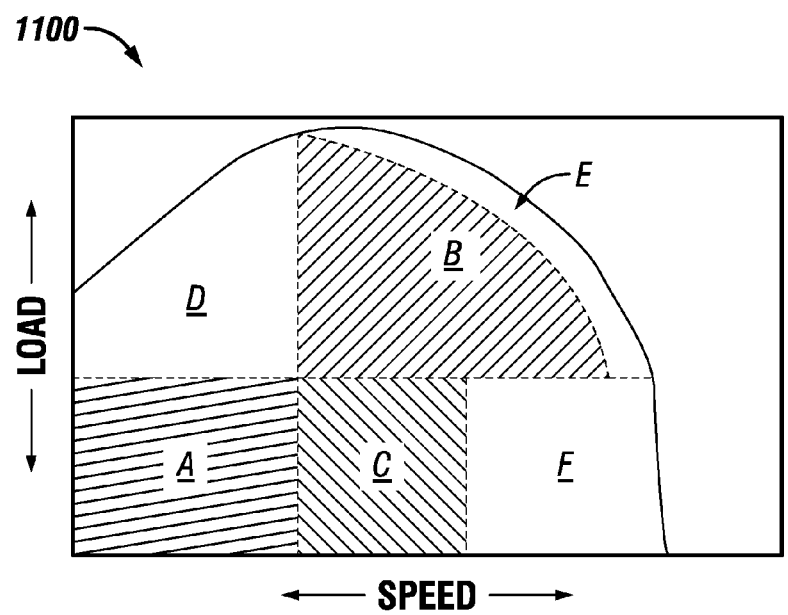
FIG. 9 is a schematic illustration of a plurality of flow regions.

FIG. 9 is a schematic illustration of an alternate system 901 for reducing $NO_x$ emissions. The system 901 includes an internal combustion engine 102 having a common rail fuel system. Where the system 901 includes multiple fuel injection events, the internal combustion engine 102 may have any type of fuel system known in the art that is capable of performing multiple fuel injection events, including the capability to perform one or more main injections and one or more post injections. In certain embodiments, the fuel system is capable of performing two post injection events.

The system 901 further includes a variable geometry turbocharger (VGT) 912. The VGT 912 may be of any type known in the art, including at least a swing vane VGT, a sliding nozzle VGT, and an internal or external bypass VGT. The mechanism of producing the variable geometry of the VGT 912 is not important, although the VGT 912 should be a device that can modulate the pressure of the exhaust gas 922.

Alternatively or additionally, the system 901 may include an exhaust throttle (not shown) to modulate the pressure of the exhaust gas 922. The exhaust throttle is responsive to an exhaust throttle command, an exhaust pressure command, and/or an exhaust pressure increase command from a controller 924. The exhaust throttle may work independently of the VGT 912 or cooperate with the VGT 912. For example, the VGT 912 may provide exhaust pressure for a range of exhaust pressures and/or engine speeds, and the exhaust throttle provides exhaust pressures at higher values of exhaust pressure and/or engine speed. In another example, the VGT 912 and the exhaust throttle cooperate to provide the commanded exhaust pressure.

The system 901 further includes an exhaust gas recirculation (EGR) path 918 having an EGR cooler 914 and an EGR valve 916. The ordering of the EGR valve 916 and EGR cooler 914 is exemplary only, and the EGR valve 916 may be a "cold side" valve (as shown) or a "hot side" valve (not shown). Additionally, the EGR path 918 may include a partial or complete bypass (not shown) for the EGR cooler 914.

The system 901 further includes a controller 924 forming a portion of a processing subsystem, wherein the controller 924 performs operations for increasing a temperature and reducing a $NO_x$ gas concentration of the exhaust gas 922 leaving the VGT 912. The processing subsystem 112 may be structured with controllers, modules, sensors, actuators, communication links, and other devices known in the art for performing the operations described herein. The controller 114 may be a single device or a distributed device, and the functions of the controller may be performed by hardware or software. All commands and information may be provided in alternate forms, some information may not be present in certain embodiments, and additional information may be present in certain embodiments. Information may be interpreted from sensor inputs, from datalink communications, from parameters on a storage medium readable by a computer, or through other information gathering devices understood in the art.

The increased temperature and reduced $NO_x$ gas concentration are relative to a nominal temperature and $NO_x$ gas concentration which would be observed in the absence of the controller 924 performing operations for increasing the temperature and reducing the $NO_x$ gas concentration. In certain embodiments, the increased temperature is a temperature at which a first aftertreatment component 908 is capable of performing a regeneration—for example if the first aftertreatment component 908 is a diesel particulate filter (DPF) the increased temperature may be the temperature at which the current regeneration mechanism (e.g. oxidation by oxygen or by $NO_2$) is enabled.

In other embodiments, the increased temperature is a temperature at which a second aftertreatment component 906 is capable of supporting a regeneration of the first aftertreatment component 908. For example, if the second aftertreatment component 906 is an oxidation catalyst, the increased temperature may be a temperature at which fuel placed in the exhaust gas 922 by an injector 910 is capable of oxidizing on the second aftertreatment component 906. In another example, if the second aftertreatment component 906 is an oxidation catalyst, the increased temperature may be a temperature at which NO in the exhaust gas 922 is capable of converting at least in part to $NO_2$. In other embodiments, the increased temperature is a temperature at which the first aftertreatment component 908 is elevated from a nominal operating temperature but is below the regeneration temperature, for example at a temperature where regeneration of the first aftertreatment component 908 can rapidly resume if system conditions allow (e.g. a load on the engine 102 subsequently increases).

The $NO_x$ gas concentration reductions are achieved with post-injection and the VGT 912, and/or with the flow of the EGR 918. In one example, some of the main fuel is injected in one or more post-injection events. More than half of the main fuel may be shifted to post-injection, and in certain embodiments there may be no main fuel (e.g. no primary fueling event that occurs before 10 degrees after TDC) with all of the fuel shifted into post-injection, with possibly a small portion of fuel injected as pilot fueling. The post-injection may be any injections that occur between about 10 degrees after TDC to about 63 degrees after TDC, and may occur as two injection events having about the same amount of fuel in each injection event.

In one example, the VGT 912 is partially closed, increasing the backpressure on the engine 102, and causing a small amount of exhaust gas to remain in-cylinder after the combustion. In another example, the VGT 912 is moved to a "highly closed" position, where a very small area for flow through the VGT 912 remains creating a large backpressure on the engine 102. The increased backpressure on the engine 102 increases the pumping work of the engine 102, resulting in higher exhaust gas temperatures. In certain embodiments, during a highly closed event, the EGR 918 is partially opened. The opening of the EGR 918 provides backpressure relief for the highly closed VGT 912, and the highly closed VGT 912 enhances the circulation rate of the EGR 918. The EGR 918 may be cooled in an EGR cooler 914, which reduces TOT but also reduces $NO_x$. The EGR 918 may bypass the EGR cooler 914 in whole or part, which enhances TOT but allows greater $NO_x$ formation.

The balancing of the post-injection, VGT 912, and EGR 918 is a mechanical step for one of skill in the art with the benefit of the disclosures herein. In certain embodiments, the VGT 912 combined with the post-injection, with the EGR 918 shut off, is sufficient to provide the increased temperature with significant $NO_x$ reduction at a flow region of the engine 102 that occurs at a low engine speed and low engine load condition. Referencing FIG. 9, the flow region "A" is a low engine speed and low engine load condition, although the shape and position of the region "A" can vary. A low engine speed and low engine load depends upon the specific system, and includes any region where the VGT 912 combined with post-injection and a shut-off EGR 918 can meet the temperature and $NO_x$ reduction targets. Non-limiting examples of low engine loads include engine loads between about 10% and 35% of a maximum torque value at a particular engine speed. Non-limiting examples of low engine speeds include engine speeds from idle up to about 50% of a maximum engine speed.

In certain embodiments, the VGT 912 combined with the post-injection and flow of the EGR 918 (with or without EGR cooling 914) is sufficient to provide the increased temperature and significant $NO_x$ reduction at a flow region of the engine 102 that occurs at a medium to high engine speed and a medium load. An exemplary VGT 912 position at medium to high engine speed is a highly open position. The highly open position of the VGT 912 reduces total air flow through the system (by providing less exhaust energy to the compressor of the VGT 912) and provides for a lower energy burden to provide a high temperature in the exhaust gases.

Referencing FIG. 9, the flow region "B" is a medium to high engine speed and a medium engine load condition, although the shape and position of this region can vary. A medium to high engine speed and a medium load depends upon the specific system, and includes any region where VGT 912 combined with the post-injection and flow of the EGR 918 (with or without EGR cooling 914) can meet the temperature and $NO_x$ reduction targets. Non-limiting examples of medium to high engine speeds include any engine speed above the low engine speed of region "A" up to a maximum engine speed, although in certain embodiments the region "B" may overlap with the region "A" in the engine speed or engine load domain. Non-limiting examples of a medium engine load include any load above the low engine load of region "A" up to and including a maximum engine load. However, thermal management of the exhaust gas 922 is rarely required at high engine loads, so a region "E" of high engine load and medium or high engine speed may exist above the region "B" and may include a region where increased VGT 912 backpressure combined with post-injection is not utilized to generate temperature and reduce $NO_x$.

In certain embodiments, some overlap of speeds and/or loads between regions "A" and "B" may occur. Further, a medium load at one engine speed may be a low engine load or a high engine load at a different engine speed. Therefore, the top of region "A" may be above the bottom of region "B" in certain embodiments and at certain engine speeds, and a gap may occur between regions "A" and "B" at certain engine speeds or loads. Additionally the system may be operated with hysteresis. For example, a delay may be imposed when the engine operating point switches between regions "A" and "B" before the thermal and $NO_x$ mechanisms associated with the regions "A" and/or "B". The delay may be a time delay (e.g. wait for a number of seconds before switching) and/or the delay may be an engine speed and/or engine load delay. For example, the system may switch from "A" to "B" at 1200 rpm and 250 ft-lbs when the engine operating condition goes from region "A" to "B" and switch from "B" to "A" at 1100 rpm and 225 ft-lbs when the engine operating condition goes from "B" to "A".

In certain embodiments, the VGT 912 is moved to a highly closed position combined with the post-injection and flow of EGR 918 (with or without EGR cooling 914) is sufficient to provide the increased temperature and significant $NO_x$ reduction at a flow region of the engine 102 that occurs at a medium engine speed and a low engine load. Referencing FIG. 9, the flow region "C" is a medium engine speed and low engine load region.

A medium engine speed and low engine load depends upon the specific system, and includes any region where the VGT 912 in a highly closed position combined with the post-injection and flow of EGR 918 (with or without EGR cooling 914) can meet the temperature and $NO_x$ reduction targets. The highly closed position of the VGT 912 is the region of the VGT 912 where closing the VGT 912 imposes a significant backpressure on the engine and begins to lower the boost pressure of the compressor side of the VGT 912. Generally, moving a VGT 912 toward a more closed position increases the boost of the VGT 912 by improving the energy transfer of the exhaust gas 922 to the blades of the VGT 912 turbine. However, as the VGT 912 closes further, the opening in the VGT 912 eventually acts as a throttle, rapidly reducing the efficiency of the VGT 912 and causing a large backpressure on the engine without an increase in energy transfer to the blades of the VGT 912 turbine.

Operation within the region "C" where the VGT 912 is highly closed is generally inefficient. However, as the engine speed increases from the engine speed of region "A", the engine 102 is flowing a greater amount of gas therethrough, to a point where eventually the mechanisms of region "A" are insufficient to generate enough temperature in the exhaust gas 922. Therefore, the VGT 912 highly closed operations of region "C" are utilized to generate sufficient temperature in the region "C". Thus, in certain embodiments, the region "C" is bounded on the low speed side by the feasibility of the region "A". As the engine speed climbs yet higher, into region "F", the operations of region "C" become impossible (due to large pressures at the inlet of the VGT 912) or highly inefficient such that in the region "F" thermal management operations utilizing the VGT 912, post-injection, and EGR 918 are no longer utilized. Thus, in certain embodiments, the region "C" is bounded on the high speed side by the feasibility and/or economics of the region "C". At higher load levels, the operations of the region "C" again become either unfeasible due to high pressures at the VGT 912 inlet, or they become unnecessary as the operations of the region "B" become sufficient to generate the increased temperature. Thus, in certain embodiments, the region "C" is bounded on the high load side by the feasibility and economics of the regions "B" and "C". The system may exhibit delays and/or hysteresis when switching between any of the regions, including region "C". The region "D" illustrates a high load, low or medium speed region wherein thermal management operations are generally not needed for most systems.

Table 1 describes a $NO_x$ reduction achieved for an exemplary engine utilizing the features described herein, including using varying features at varying operating points. The temperatures were increased, but the temperature increase was not quantified in this experiment. The $NO_x$ measurement shown is the change in the $NO_x$ for the modified behavior ("Regen mode" $NO_x$) from regions "A", "B", and "C" utilizing post-injection, VGT 912, and/or the EGR 918 relative to unmodified behavior ("Normal mode" operation). The $NO_x$ reduction is shown as % $NO_x$ reduction=(Normal mode $NO_x$−Regen Mode $NO_x$)/Normal mode $NO_x$. Therefore, where Normal mode $NO_x$ is 100 units and Regen mode $NO_x$ is 65 units, the % $NO_x$ reduction=(100−65)/100=35%. The data in Table 1 illustrates that, for a wide range of operating conditions, the thermal increase to assist in regenerating an aftertreatment component is at least neutral to $NO_x$ generation, and significant reductions in $NO_x$ generation are possible at many operating conditions.

TABLE 1

$NO_x$ reduction

| Engine Torque (ft-lb) | | | | | | | | | $NO_x$ reduction (%) | | | | | | | | | |
|---|---|---|---|---|---|---|---|---|---|---|---|---|---|---|---|---|---|---|
| 800 | — | — | — | — | — | — | — | — | — | — | — | — | 4 | 12 | 8 | — | — | — |
| 700 | — | — | — | — | — | — | — | — | — | — | 11 | 9 | 5 | 2 | 1 | 4 | 6 | — |
| 600 | — | — | — | — | 21 | 20 | 10 | 2 | 0 | 5 | 8 | 6 | 0 | 6 | 4 | 6 | 11 | — |
| 500 | — | — | — | 35 | 9 | 6 | 15 | 9 | 6 | 6 | 20 | 0 | 6 | 3 | 6 | 5 | 13 | 7 |
| 400 | — | — | — | 56 | 18 | 27 | 6 | 12 | 3 | 29 | 37 | 29 | 9 | 9 | 7 | 8 | 8 | 1 |
| 300 | — | — | — | 34 | 10 | 17 | 9 | 7 | 20 | 39 | 27 | 17 | 9 | 1 | 1 | 5 | 3 | 4 |
| 200 | — | — | — | 51 | 0 | 10 | 15 | 20 | 49 | 48 | 50 | 55 | 37 | 25 | 19 | 26 | 13 | 10 |
| 100 | — | — | — | 57 | 26 | 18 | 10 | 7 | 42 | — | — | — | — | — | — | — | — | — |
| 50 | 61 | 54 | 49 | 50 | — | — | — | — | — | — | — | — | — | — | — | — | — | — |
| | 600 | 700 | 750 | 800 | 900 | 1000 | 1100 | 1200 | 1300 | 1400 | 1500 | 1600 | 1700 | 1800 | 1900 | 2000 | 2100 | 2200 |
| | | | | | | | | | Engine speed (RPM) | | | | | | | | | |

Referencing Table 1, specific average $NO_x$ reductions of at least 25% are achievable for low engine loads, for example less than 50% of a maximum engine load, and for medium engine speeds, for example between about 800 RPM and 1600 RPM. Further, specific average $NO_x$ reductions of at least 50% are achievable for very low engine loads, below about 10% or about 6%, and at low engine speeds, for example below about 800 RPM. The $NO_x$ reductions for a particular system are achievable by scheduling post-injection events according to the descriptions herein, along with exhaust pressure modulation with a VGT and/or exhaust throttle.

Where greater $NO_x$ reduction is required for specific operating points, the following elements may be added: intake throttle adjustments and bypass of an EGR cooler in the EGR stream. The order of elements to reduce $NO_x$ and generate increased temperature may preferably be: post-injection adjustments, exhaust pressure increase, intake throttle modulation to reduce intake air flow, and then EGR cooler bypass operations. However, in particular embodiments, the elements to reduce $NO_x$ and increase temperature may be performed in any order of preference, and at particular engine operating points the preferred order of elements may be changed. The mapping of the $NO_x$ reduction and temperature increase against the specific operating elements to reduce $NO_x$ and generate increased temperature is a mechanical step to one of skill in the art having the benefit of the disclosures herein.

The system 901 includes, in certain embodiments, a controller 924 structured to perform various operations for increasing an exhaust gas 922 temperature and reducing a $NO_x$ amount in the exhaust gas 922. The controller is in communication with various sensors, actuators, and/or other devices in the system 901. The controller includes a computer readable storage medium, a processor that executes commands, and a computer program product stored on the computer readable storage medium. The controller may be a single computing device or a plurality of distributed computing devices in communication.

In certain embodiments, the controller 924 interprets an engine load value and determines a first fuel combustion amount and a second combustion amount in response to the engine load value. The first fuel combustion amount may be between about 10% to 60% of a combustion fuel amount, and the first fuel combustion amount and the second combustion amount combined are a total amount of fuel contributing to combustion and injected within a single combustion stroke. The first fuel combustion amount may be a main fuel injection and the second combustion amount may be one or more post fuel injections. In certain embodiments, the first fuel combustion amount may less than 10% of the combustion fuel amount, including zero, and all of the fuel contributing to the combustion and injected within a single combustion stroke may be post-injected fuel. In certain embodiments, there may be an amount of pilot fuel injected.

An exemplary system 901 includes the controller commanding the common rail fuel system to deliver the first fuel combustion amount before 10 degrees after top dead center (TDC) and to deliver the second combustion amount after 10 degrees after TDC and before 63 degrees after TDC. Delivering a fuel amount before a timing value indicates that the beginning of the injection event occurs before that timing value, although the injection event may still be occurring at the timing value. The first fuel combustion amount may be injected as at least one main fuel injection, and the second combustion amount may be injected as at least one post fuel injection.

In certain embodiments, the first fuel combustion amount further is less than 25% of the combustion fuel amount when the engine load value is less than 40% of a maximum engine load value. In certain embodiments, in response to the engine load value having a value at least equal to 40% of a maximum engine load value, the first fuel combustion amount is approximately equal to the second combustion amount. Alternate embodiments include, in response to the engine load value having a value at least equal to 40% of a maximum engine load value, the first fuel combustion amount and the second combustion amount comprise a ratio having a value between 3:7 and 7:3 inclusive. The second combustion amount may be injected at least 3 crank angle degrees after the first fuel combustion amount is injected, or the second combustion amount may be injected during two injection events separated by not less than 3 crank angle degrees. In certain embodiments, the injection events (either the first fuel combustion amount injection event and the second combustion amount injection event, or two separate injection events within the second combustion amount) are separated by at least 5 crank angle degrees, or at least 10 crank angle degrees. In certain embodiments, the injection events (either the first fuel combustion amount injection event and the second combustion amount injection event, or two separate injection events within the second combustion amount) are separated by not more than 2.8 milliseconds.

An exemplary procedure to increase turbine outlet temperature (TOT) and to reduce $NO_x$ emissions is described. The procedure includes an operation to fuel an internal combustion engine with a first fuel amount and a second fuel amount. The first fuel amount and second fuel amount add up to a total amount of fuel burned in a combustion chamber of the internal combustion engine during a combustion event. The procedure includes the operation to fuel the internal combustion engine with the first fuel amount by injecting fuel before 10 degrees after top dead center (TDC), and to fuel the internal combustion engine with the second fuel amount by injecting fuel between 10 degrees after TDC and 63 degrees after TDC. The procedure further includes an operation to increase backpressure on the engine produced by a variable geometry turbocharger during the fueling.

Certain embodiments of the procedure include operations as described following. Operations may be re-ordered, combined, separated, substituted, or removed. An exemplary procedure includes an operation to divide the second fuel amount into two post injection events, where the two post injection events may include equal portions of the fuel. The procedure includes an action to operate a variable geometry turbocharger (VGT) and to fuel the engine with the second fuel amount such that a turbine outlet temperature (TOT) is increased and a $NO_x$ produced amount is decreased. The procedure includes an operation to shut off an exhaust gas recirculation at a flow region that is a low engine speed and a low engine load, and/or an action to operate the VGT to a highly closed position and to flow an exhaust gas recirculation at a flow region that is a medium engine speed and a low engine load.

Embodiments of a method to rapidly initiate a regeneration event for a diesel particulate filter are described. The operations are applicable to any aftertreatment component disposed in the exhaust stream of an engine wherein the aftertreatment component requires periodic, temperature supported regeneration. Regeneration of aftertreatment components typically requires a heating period where the component is raised to a temperature that supports regeneration, and then a holding period at an elevated temperature where the component is regenerated. Currently available aftertreatment regeneration schemes suffer from an inability to regenerate, or to regenerate efficiently, where the engine is in an application with high load variability, stop-and-go operation, or in highly transient duty cycles. Therefore, in presently available aftertreatment regeneration schemes, behaviors are included that are inefficient from a fuel economy standpoint, or that are inconvenient for the operator. An exemplary behavior for a presently available aftertreatment regeneration scheme is to prevent the regeneration event from occurring until a vehicle, utilizing the engine as the power plant, achieves a minimum speed threshold.

The described operations of the method are exemplary, and various operations may be re-arranged, split, combined, omitted, or substituted in certain embodiments. The method includes determining that an engine operates with a challenging duty cycle. The challenging duty cycle involves any aspects of the engine duty cycle that make standard regeneration operations difficult. Examples of determining the challenging duty cycle include determining that the engine operates with a highly transient load for a threshold percentage of the operating time, determining that the engine only rarely exceeds specified load thresholds for specified periods of time, determining that a threshold percentage of attempted regenerations fail to proceed to completion, receiving an input (e.g. from an operator or a manufacturer) that sets a parameter indicating that the engine operates with a challenging duty cycle, and/or any other type of determination that may be known to one of skill in the art contemplating a specific embodiment that indicates that regeneration events of the aftertreatment component may not be successful a significant portion of the time. In certain embodiments, the method performs mitigation steps for a challenging duty cycle without determining whether the duty cycle is challenging.

The method further includes controlling the temperature of an aftertreatment component disposed in an exhaust stream of the engine to a specified temperature in response to one or more of the following conditions: a regeneration event for the aftertreatment component is presently initiated or scheduled to begin, the engine is operating in a challenging duty cycle, and a cost factor for achieving a regeneration temperature (which is a temperature higher than the specified temperature) for the aftertreatment component is too high. Determining the cost factor is too high includes any determination that achieving the regeneration temperature is not possible, is too expensive, or is otherwise presently undesirable.

The expense of achieving the temperature may be determined in terms of a fuel economy expense or an engine operating impact expense. For example, a first fueling value to achieve an operator requested torque value may be determined for an exhaust temperature at the specified temperature and a second fueling value to achieve the operator requested torque value may be determined for an exhaust temperature at the regeneration temperature. Where the difference between the first fueling value and the second fueling value is greater than a threshold it may be determined that the cost factor is too high. The difference in the first fueling value and the second fueling value may occur due to behaviors that cause inefficiency in operation to achieve temperature—including without limitation manipulations of engine fueling, timing, turbine geometry, and/or injection of fuel into the aftertreatment system. Any other cost factor—for example predicted wear on parts from turbine inlet pressure, estimated or measured cylinder pressure, turbine inlet temperature, or any other parameter that can be converted into a cost value may be utilized for the cost factor.

Alternatively or additionally, an operator impact may be utilized as a cost factor. For example, a first operator satisfaction parameter may be determined for the exhaust temperature at the regeneration temperature and a second operator satisfaction parameter may be determined for the exhaust temperature at the specified temperature. Where the difference between the first operator satisfaction parameter and the second operator satisfaction parameter is greater than a threshold it may be determined that the cost factor is too high. Non-limiting examples of operator satisfaction parameters include an engine responsiveness parameter, an engine maximum torque parameter, an engine noise parameter, and/or an undesired features impact parameter (e.g. if the fan is turned on or off, cruise control disabled, an engine governor type is switched, an engine governor type choice is limited, a power-takeoff mode is disabled, or any other engine feature is undesirably altered to support generating the regeneration temperature).

The cost factor determination, in certain embodiments, is a determination that the engine is capable of achieving the regeneration temperature and/or that the engine is operating under specified conditions. For example, if a thermal management scheme is available for the engine to achieve the regeneration temperature the cost factor determination may indicate that the aftertreatment component is to be controlled to the regeneration temperature. In one example, the cost factor is set to a lowest value where the engine is capable of delivering the regeneration temperature (e.g. by setting the cost factor to zero or another value known to automatically select the regeneration temperature) and the cost factor is set to a highest value where the engine is not capable of delivering the regeneration temperature (e.g. by setting the cost factor to infinity, a highest fixed point value, or another value known to automatically prevent the regeneration temperature and/or select the specified temperature or to disable thermal management). In another example, if the specified condition is an engine speed and/or load threshold, or a vehicle speed threshold, and the operating conditions of the engine and/or vehicle meet the threshold, the cost factor determination may indicate that the aftertreatment component is to be controlled to the regeneration temperature.

Certain embodiments of the method include applying a hysteresis to the cost factor determination. For example, where a 15% fueling difference between first fueling value and the second fueling value is determined to be the threshold where operations switch from controlling to the specified temperature to controlling to the regeneration temperature, the method may include switching at 15% on the downside (i.e. switching to the specified temperature) and switching at 17% on the upside (i.e. switching back to the specified temperature). Any hysteresis operations understood in the art are contemplated herein, including time-based hysteresis, absolute value-based hysteresis, and relative value-based hysteresis.

Where the determination is made to control the aftertreatment component to the specified temperature, the method includes operations to control the aftertreatment component to the specified temperature until the regeneration event is resumed (e.g. the cost factor determination indicates control is resumed to the regeneration temperature) or until the regeneration event is completed or stopped. The stopping of the regeneration event may be for any reason, including at least a shutdown of the vehicle, the expiration of a timer, and/or the changing of engine or vehicle operations to a threshold where even the reduced cost factor of maintaining the specified temperature exceeds a threshold.

In certain embodiments, when a regeneration event for the aftertreatment component is indicated, there exists an upper set of conditions (e.g. speed, load, and/or thermal management capability conditions) wherein the regeneration is performed and the aftertreatment component is controlled to the regeneration temperature and a lower set of conditions wherein the regeneration is not performed (or is performed but much more slowly than nominal) and the aftertreatment component is controlled to the specified temperature. In further embodiments, there may exist a second lower set of conditions wherein the aftertreatment component temperature is not controlled. In certain embodiments the specified temperature may be maintained at all operating conditions outside of the upper set of conditions, including engine idle.

The specified temperature is a temperature that is elevated from nominal operation but that is lower than the regeneration temperature. The selection of a specified temperature is dependent upon the specific controls and hardware available for a particular embodiment, and also dependent upon application specific conditions that cannot be known in the abstract but that will generally be known to the designer, manufacturer, and/or purchaser of an engine and/or application. For example, the specified temperature may be a temperature that is achievable at engine idle with available thermal management features activated. The specified temperature may be a temperature that is achievable at an operator specified operating condition with all relatively efficient thermal management feature activated (e.g. with a variable geometry turbine producing backpressure but not in a "highly closed" position). The specified temperature may be a temperature that is just below an operator specified maximum temperature based on the application—for example a maximum temperature of the aftertreatment component with a stationary vehicle (e.g. to avoid issues with a stationary vehicle having a heated component exposed underneath the vehicle). The specified temperature may be a temperature that allows the regeneration temperature to be achieved within a specified time after the regeneration temperature is requested, based upon the thermal management features available to achieve the regeneration temperature.

In certain embodiments, the specified temperature may be a variable temperature at different operating points. For example, the specified temperature may be a first value of the specified temperature in a moving vehicle and a second value of the specified temperature in a stationary vehicle. The provided examples are non-limiting and illustrate only a few of the considerations that are contemplated herein.

Figure 10:
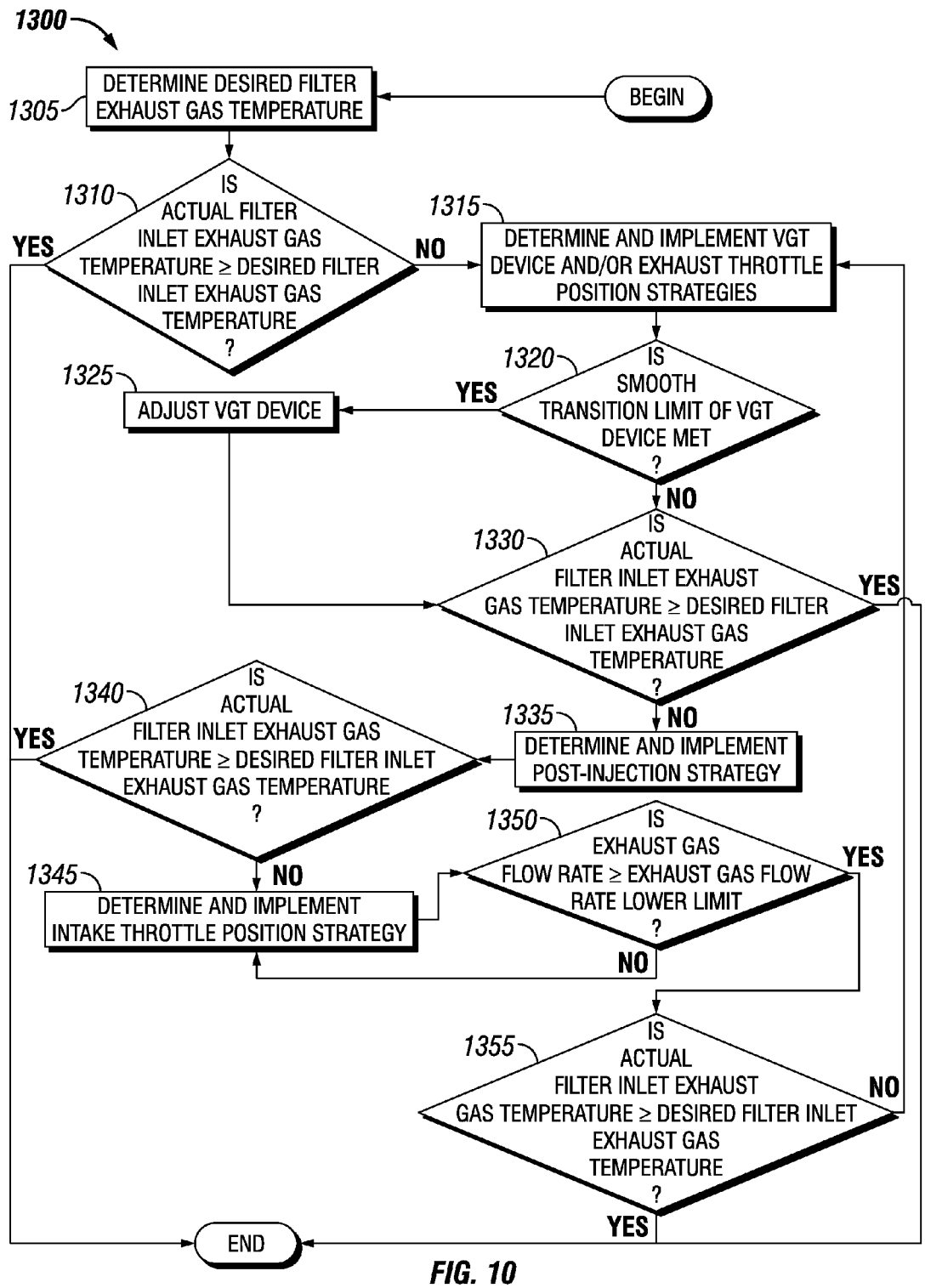
FIG. 10 is a schematic flow diagram of a technique for efficient thermal management.
Figure 11:
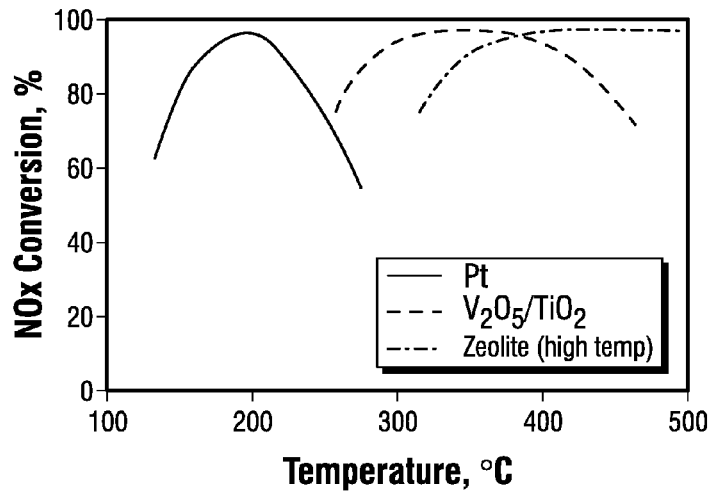
FIG. 11 is an illustration of $NO_x$ conversion efficiencies for a number of SCR catalysts.
Figure 12:
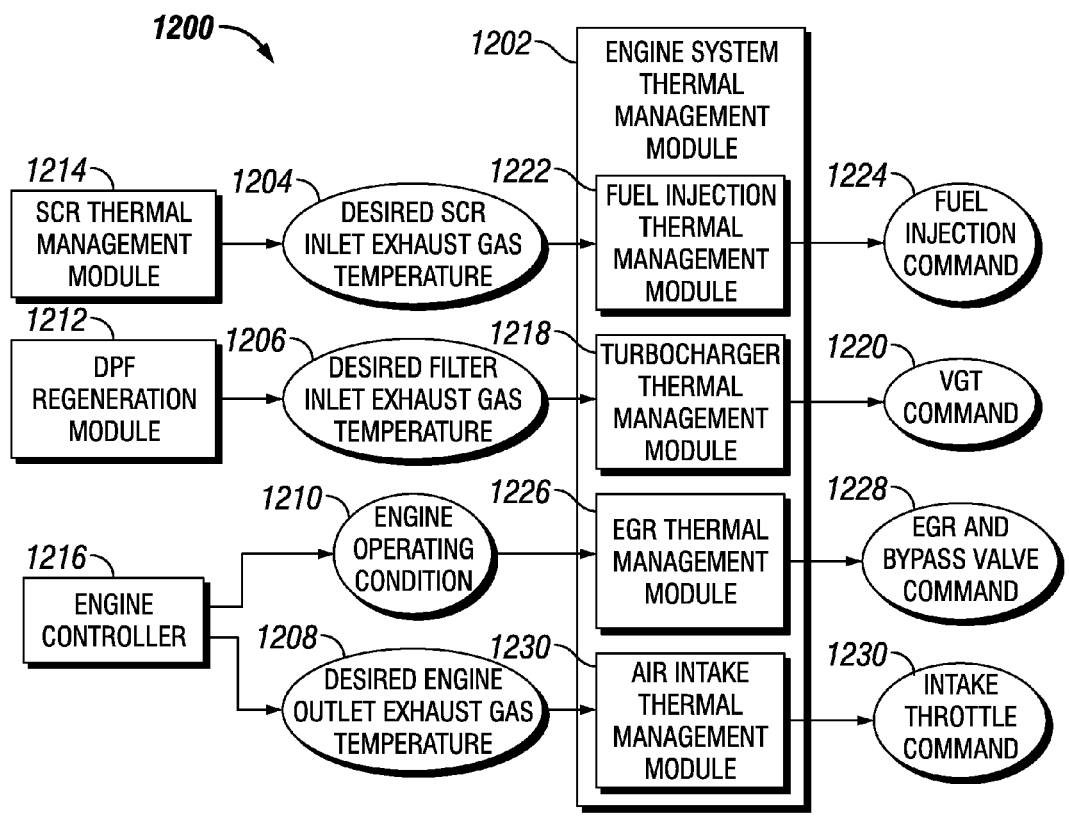
FIG. 12 is a schematic diagram of an apparatus including an engine system thermal management module.

Referencing FIG. 10, embodiments of an exemplary technique 1300 to optimize engine performance during regeneration events for a diesel particulate filter, for an SCR catalyst, and/or for a different aftertreatment component are described. The optimizations include thermal management modes of an engine. SCR systems require specified temperatures to maintain a maximum $NO_x$ conversion efficiency. For example, referencing FIG. 11, temperature ranges for $NO_x$ conversion efficiency of various catalysts are illustrated. The values illustrated in FIG. 11 are generally understood in the art. The optimal temperatures are, at least at certain operating conditions, elevated from otherwise nominal engine exhaust temperatures. Particulate filtering (e.g. a diesel particulate filter, DPF) systems also require periodic temperatures (often in the range of 525-650° C.) that are elevated from otherwise nominal engine exhaust temperatures. Certain aftertreatment systems include an oxidation catalyst (DOC), typically upstream of a DPF and/or SCR. The DOC can assist to generate heat, for example by oxidizing un-burned fuel, but has a light-off temperature of about 250° C., which is elevated above nominal operating temperatures at least in certain operating conditions.

The exemplary technique 1300 describes operations that may be re-ordered, divided, combined, omitted, and/or substituted. The technique 1300 is functionally similar to a technique (not shown) that may be utilized to achieve a desired SCR inlet exhaust gas temperature and/or a desired engine outlet exhaust gas temperature for other aftertreatment components The technique 1300 includes an operation 1305 to determine a desired filter exhaust gas temperature and a determination 1310 whether the actual filter inlet exhaust gas temperature already achieves the desired filter exhaust gas temperature. Where the determination 1310 is "No", the technique 1300 includes an operation 1315 to determine and implement a VGT strategy and VGT command, and a determination 1320 whether a smooth transition limit of the VGT device is met (i.e. whether the VGT device is operable to the VGT strategy position consistent with smooth operation of the engine). Where the determination 1320 is "Yes", the technique 1300 includes an operation 1325 to adjust the VGT device. The technique 1300 includes a determination 1330 whether the actual filter inlet exhaust gas temperature already achieves the desired filter exhaust gas temperature. Where the determination 1330 is "No", the technique 1300 includes an operation 1335 to determine and implement a post-injection strategy and command, and a determination 1340 whether the actual filter inlet exhaust gas temperature already achieves the desired filter exhaust gas temperature.

Where the determination 1340 is "No", the technique 1300 includes an operation 1345 to determine and implement an intake throttle strategy and command, and a determination 1350 whether an exhaust gas flow rate is greater than or equal to an exhaust gas flow rate lower limit. Where the determination 1350 is "No", the technique includes a determination (not shown) whether the actual filter inlet exhaust gas temperature already achieves the desired filter exhaust gas temperature, and where the determination (not shown) is "No" the technique 1300 continues the operation 1345 until the temperature is met or the determination 1350 is "Yes". The technique 1300 further includes a determination 1355 whether the actual filter inlet exhaust gas temperature already achieves the desired filter exhaust gas temperature, and where the determination 1355 is "No" the technique 1300 returns to the operation 1315. The technique 1300 is exemplary, and certain available determinations such as, but not limited to, checking for fuel dilution (due to excessive fuel in the engine oil from prolonged very late post injection) and pressure limits are not utilized in the exemplary technique 1300. Further, certain actuators such as the EGR valve, EGR bypass valve, and an exhaust throttle are not operated in the exemplary technique 1300, but may be implemented in the same cascading logic fashion of the technique 1300.

An apparatus and method for controlling engine exhaust gas temperatures, fuel dilution levels, and engine performance during SCR thermal management and DPF regeneration events is described.

A system includes one or more of a VGT and/or exhaust throttle, an intake throttle, an EGR cooler (which may include a bypass or a variable bypass), and a fuel system capable of providing multiple fuel post-injections. An apparatus integrates operations of the system components to improve diesel engine performance during a DPF regeneration mode and/or during an SCR thermal management mode.

The apparatus 1200 includes an engine system thermal management module 1202 having a plurality of modules structured to functionally execute the operations of the apparatus. The use of modules in the present description highlights the functional independence of the operations of the apparatus and represents one non-limiting organizational structure for the operations of the apparatus. The modules described herein may be elements of a computer program product stored on a computer readable medium and executed by a computer. The operations of the modules may be subdivided, distributed, and certain operations may be omitted, re-ordered, combined, and/or substituted.

The engine system thermal management module 1202 is operable to interpret a desired SCR inlet exhaust gas temperature 1204, a desired filter inlet exhaust gas temperature 1206, and/or a desired engine outlet exhaust gas temperature 1208. Interpreting a parameter herein includes receiving the parameter as a network or datalink communication, reading the parameter from a memory location on a computer readable medium, receiving the parameter as an electronic communication, and/or receiving related or pre-cursor parameters and calculating the parameters therefrom. The engine system thermal management module 1202 is further structured to interpret engine operating conditions 1210 as described herein.

The engine operating conditions 1210 are interpreted from parameters provided by a controller such as an engine controller 1216, received from communications, received from electronic signals, and/or received from sensors. The engine system thermal management module 1202 may be partially or wholly included on the engine controller 1216, or the engine system thermal management module 1202 may be separate from the engine controller 1216. Portions of the engine system thermal management module 1202 may be distributed on more than one computer, and portions of the engine system thermal management module may be implemented in software or hardware.

Certain embodiments of the apparatus 1200 include a DPF regeneration module 1212 that provides the desired filter inlet exhaust gas temperature 1206, and an SCR thermal management module 1214 that provides the desired SCR inlet exhaust gas temperature 1204. An exemplary operation of the DPF regeneration module 1212 includes providing a desired filter inlet exhaust gas temperature 1206 sufficient to regenerate the DPF. An exemplary operation of the SCR thermal management module 1214 includes providing a desired SCR inlet exhaust gas temperature 1204 to achieve a desired SCR conversion efficiency (e.g. reference FIG. 11).

In response to the operations of the engine system thermal management module 1202 and to the available desired temperatures 1204, 1206, 1208, a turbocharger thermal management module 1218 provides a VGT strategy and VGT command 1220, a fuel injection thermal management module 1222 provides a fuel injection strategy and fuel injection command 1224, an EGR thermal management module 1226 provides an EGR flow and EGR bypass strategy, and an EGR flow and bypass valve command 1228, and an air intake thermal management module 1230 provides an intake throttle strategy and intake throttle command 1230. The provided commands may be utilized partially or completely by an engine controller 1216.

For example the engine controller may accept the commands, and apply a prioritization scheme to the commands relative to other commands (e.g. to meet operator torque and/or speed requests), accounting for the role of the commands in operating the engine for emissions compliance, aftertreatment component regeneration, and/or aftertreatment component maintenance. In certain embodiments, the engine controller 1216 may utilize the commands directly to operate the fuel injectors (especially regarding post-injection events), the VGT, the EGR valve and/or EGR bypass valve, and/or the intake throttle. The VGT device position strategy, the post-injection fuel injection strategy, the intake throttle position strategy, and/or the EGR valve and EGR cooler bypass valve position strategy cooperatively achieve the desired SCR inlet exhaust gas temperature for SCR thermal management, and achieve the particulate matter filter inlet exhaust gas temperature for DPF regeneration.

The fuel injection thermal management module 1222 includes a fuel dilution module (not shown) that determines a maximum fuel dilution level of the engine, and limits the fuel injection command such that an actual fuel dilution level is maintained below or equal to the maximum allowable fuel dilution level. For example, the fuel injection thermal management module 1222 may track an accumulated amount of fuel dilution contributed by very late post injection events (e.g. based on the number, size, and timing of the events) since a prior engine oil change event, and thereby limit the fuel dilution of the engine oil.

In certain embodiments, the apparatus controls the temperature of the inlet exhaust of an SCR or a DPF for SCR thermal management or a DPF regeneration event. The VGT device position may be utilized as a first lever to achieve the desired SCR or DPF inlet exhaust gas temperature. Where the allowable VGT positions do not achieve the desired SCR or DPF inlet exhaust gas temperature, one or more post-injection events may be utilized as a second lever to achieve the desired SCR or DPF inlet exhaust gas temperature. Where the available post-injection events do not achieve the desired SCR or DPF inlet exhaust gas temperature, the intake throttle may be utilized as a third lever to achieve the desired SCR or DPF inlet exhaust gas temperature. Where the available positions of the intake throttle do not achieve the desired SCR or DPF inlet exhaust gas temperature, the EGR valve and EGR cooler bypass valve may be used as a fourth lever to achieve the desired SCR or DPF inlet exhaust gas temperature. The listed order of the temperature levers is exemplary and subject to the limitations and priorities of specific embodiments. The levers may be used sequentially as presented or simultaneously, and may be operated in open loop based upon calibrations from experimental or empirical data, or in a closed loop fashion based upon measured temperatures.

Certain limitations and operational considerations are described as follows, but the described limitations and operational considerations are exemplary, may not be present in certain embodiments, and other limitations or operational considerations may be present in other embodiments. The VGT position, exhaust throttle position, and/or intake throttle position can manipulate charge air flow, and reduce the air fuel ratio or increase the pumping work at different operating conditions to elevate the exhaust gas temperature. At low load/speed operations, a closed VGT or exhaust throttle can be used to increase pumping work so that the engine exhaust gas temperature can be elevated. An intake throttle can also be used to further increase in exhaust gas temperature by reducing charge air flow and reduce the noise caused by air passing through. At middle to high speed/load operation, a fully open VGT helps to reduce charge air flow hence air fuel ratio, so that engine exhaust gas temperature can be raised.

Multiple post injections promote fuel evaporation and raise engine exhaust gas temperature. Multiple post injections further promote some of the combustion energy generated to exit the combustion chamber as heat rather than to provide work to the crankshaft, further promoting engine exhaust gas temperature. However, as described preceding, certain very late injection events, and post injection events generally over time, place a certain amount of fuel into the engine oil and contribute to fuel dilution of the engine oil. Cooled EGR or hot EGR can be used as an additional lever to increase turbine outlet temperature, allowing for trade-offs of engine-out $NO_x$/smoke and overall engine performance by allowing the apparatus to improve fuel economy with a lesser use of VGT/exhaust throttle and to reduce fuel dilution with a lesser use of post-injection. At certain operating conditions, the EGR flow required to achieve the desired turbine outlet temperature is not available and other levers can be utilized. As described, integration of multiple post injections, VGT/exhaust throttle and/or intake throttle, combined with cooled and/or bypassed EGR provides a smooth transient operation strategy to provide the desired temperatures across the engine operating range.

In certain embodiments, the engine system thermal management module 1202 includes a predetermined map that has empirically obtained engine outlet exhaust gas temperatures, SCR and DPF inlet exhaust gas temperatures, and fuel dilution levels for given VGT device positions, multiple fuel post-injections, air intake throttle positions, EGR valve and EGR cooler bypass valve. In such implementations, the determination of the VGT strategy, multiple fuel injection strategy, air intake actuation strategy, EGR valve and EGR cooler bypass valve strategy by the engine system thermal management module 1202 can include accessing data from the predetermined map. In certain embodiments, the SCR thermal management is active while exhaust temperatures are lower than the desired SCR conversion value (determined from data such as that illustrated in FIG. 11), and the DPF thermal management is active during a DPF regeneration event. The predetermined map may include separate maps for the SCR thermal management and for the DPF thermal management, and further may include separate information as a function of a present fuel dilution level or where the fuel dilution level is saturated (i.e. where no further thermal management based fuel dilution is allowable).

Embodiments of a system and method for performing a low temperature warm-up assist for an SCR catalyst are described. A technique for low temperature warm-up assistance for the SCR catalyst includes providing materials to an upstream DOC (or other oxidation catalyst) that oxidize at lower temperatures than engine fuel, and/or providing materials at the SCR that assist in providing for enhanced low temperature reduction of NOx at the SCR.

Figure 15:
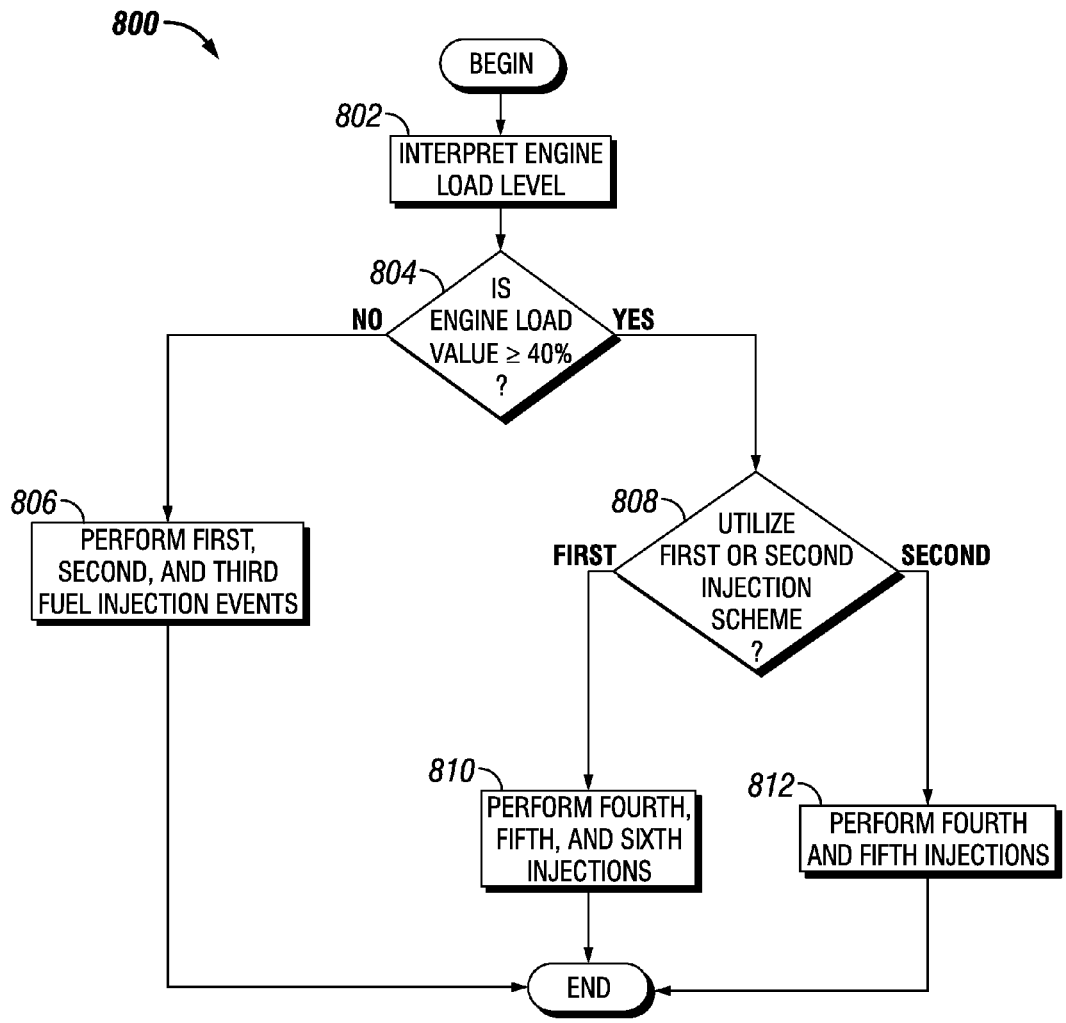
FIG. 15 is a schematic flow diagram illustrating an alternate technique for reducing $NO_x$ emissions.

Referencing FIG. 15, an exemplary system 1500 includes a fuel reformer 1502 positioned to receive fuel from a fuel source 1504 (e.g. from the engine fuel tank) and to provide CO and $H_2$ into the exhaust stream upstream of the a DOC. The utilization of CO and $H_2$ in the DOC lowers the "light-off" temperature of the DOC to 150° C. or lower, allowing early temperature generation to boost the SCR temperature more quickly than otherwise available. The presence of $H_2$ further assists an SCR catalyst 1508 in reducing $NO_x$ at low temperatures, and the presence of $H_2$ with CO on a Pt-based SCR catalyst improves the low temperature performance of the catalyst. In certain embodiments, $H_2$ is provided to an SCR bed during low temperature conditions with a lean burn engine. The system 1500 may include one or more temperature sensors 1514.

In certain embodiments, the fuel reformer system provides CO and $H_2$ to the exhaust stream in response to the engine exhaust gas being below a threshold temperature. For example, a controller 1510 determines that the exhaust gas is below the threshold temperature, the engine 1512 is in a warm-up period at cold ambient temperature and/or the engine 1512 is operating at startup operations. The controller 1510 may deactivate the fuel reformer 1502 when the SCR catalyst achieves a threshold temperature value.

In certain embodiments, a fuel reformer 1502 is provided and utilized during DPF regeneration operations. The fuel reformer 1502 to assist DPF regeneration operations may be utilized instead of direct hydrocarbon injection, in-cylinder hydrocarbon injection, or may be utilized with those injection systems also available. The oxidation of soot in a DPF in the presence of CO and $H_2$ occurs at a much lower temperature than for an oxygen based mechanism, which can require temperatures exceeding 250-300° C. A fuel reformer 1502 using standard composition diesel provides $H_2$ and CO according to the formula: $C_1H_{1.86}+\frac{1}{2}O_2 \Rightarrow 1.86/2H_2+CO$. However, the fuel reformer 1502 may be any type known in the art, including at least a gasoline-based, propane-based, bio-diesel-based, ethanol-based, methanol-based, and/or a plasma reformer. The reformer 1502 may be utilized on the engine fuel 1504 or other available fuel source. In certain embodiments, such as for a stationary application, organic waste products and/or renewable bio-products may be converted to CO and $H_2$ in a Fischer-Tropsch reaction.

Figure 13:
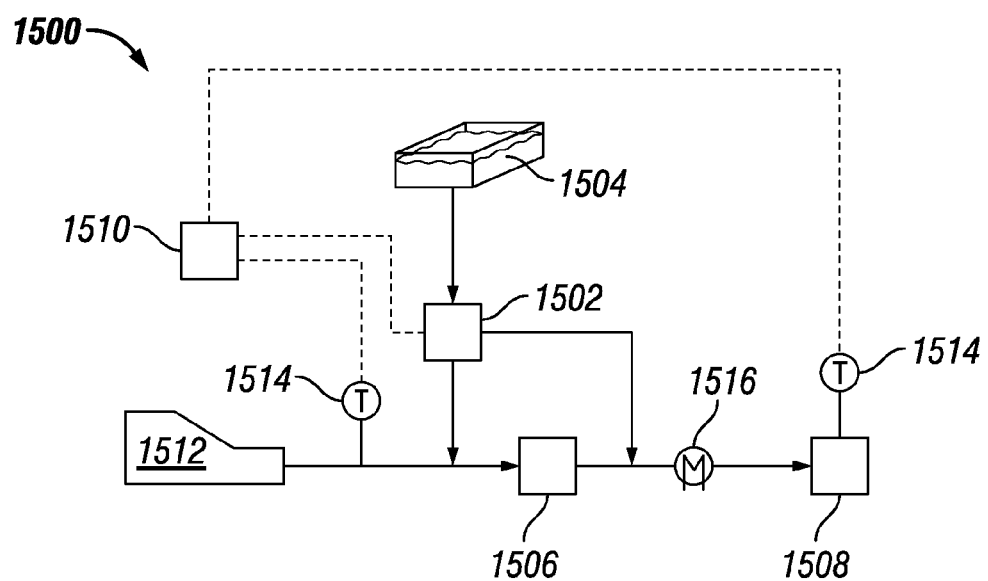
FIG. 13 is a schematic illustration of an alternate system for reducing $NO_x$ emissions.

In certain embodiments, a system includes a thermal assist device 1516 that is a hydrocarbon (or other available fuel) burner that provides heat directly to an SCR inlet and/or a DOC inlet. The thermal assist device 1516 illustrated in FIG. 13 is provided directly upstream of the SCR catalyst 1508. The burner allows for immediate injection of the $NO_x$ reduction reagent to proceed, and/or allows for rapid warm-up of the SCR catalyst 1508 to reduce the emissions impact of the startup and/or warm-up cycle.

Figure 14:
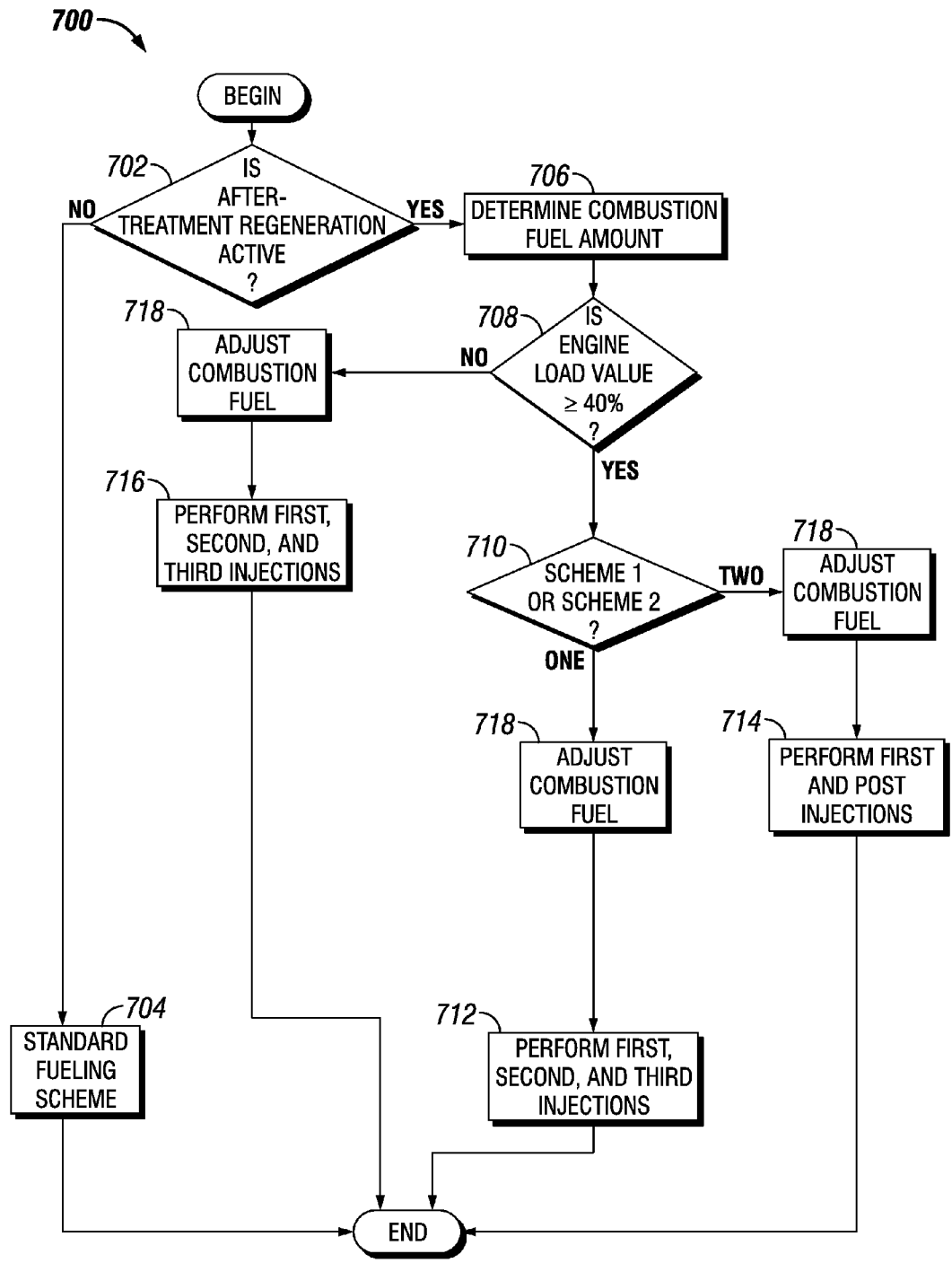
FIG. 14 is a schematic flow diagram illustrating a technique for reducing $NO_x$ emissions.

FIG. 14 is a schematic flow diagram illustrating a technique 700 for reducing $NO_x$ emissions. The technique 700 includes an operation 702 to determine whether an aftertreatment regeneration is active. In response to determining the aftertreatment regeneration is not active, the technique 700 includes an operation 704 to implement a standard fueling scheme.

In response to determining the aftertreatment regeneration is active, the technique 700 includes an operation 706 to determine a combustion fuel amount for an engine 102 having at least one piston. The technique 700 further includes an operation 708 to determine whether an engine load level exceeds 40% of a maximum engine load level. In response to the engine load level being at least equal to 40% of the maximum engine load level, the technique 700 further includes an operation 710 to check whether a first injection scheme or second injection scheme is utilized.

When the first injection scheme is utilized, the technique 700 includes an operation 712 to perform a first fuel injection event before 10 degrees after TDC including less than 50% of the combustion fuel amount, a second fuel injection event after 10 degrees after TDC including 5% to 45% of the combustion fuel amount, and a third fuel injection event after the second fuel injection event including 5% to 55% of the combustion fuel amounts. When the second injection scheme is utilized, the technique 700 includes an operation 714 to perform a first fuel injection event before 10 degrees after TDC including less than 50% of the combustion fuel amount, and at least one post injection, each post injection occurring after 10 degrees after TDC, and the sum of the post injection events having a fueling amount greater than 50% of the combustion fuel amount.

The first and second injection schemes represent examples of injection schemes under the present application to reduce emissions, and generally represent a framework for organizing fueling controls. A given embodiment may utilize the first injection scheme, the second injection scheme, and/or other injection schemes consistent with the disclosures herein. The selection of an injection scheme need not be exclusive—for example an embodiment may utilize the second injection scheme with parameters within the ranges of post injection events described for the second injection scheme that also overlap ranges of post injection events described for the first injection scheme.

In response to the engine load level being less than 40% of the maximum engine load level (the operation 708 determining NO), the technique further includes an operation 716 to perform a first fuel injection before 8 degrees after TDC including less than 25% of the combustion fuel amount, a second fuel injection event after 10 degrees after TDC including between 15% and 65% of the combustion fuel amount, and a third fuel injection event occurring after the second fuel injection event including between 10% and 85% of the combustion fuel amount. In certain embodiments, the technique 700 further includes an operation 718 to determine an engine torque output request, and to adjust the combustion fuel amount based on the timing and fueling amounts of a plurality of fuel injections such that the engine 102 achieves the engine torque output request. The operation 718 is performed according to the fuel injection scheme for the technique 700, and occurs between determining the fueling and timing for each injection event and performing each fuel injection event.

Certain operations of FIG. 14 may be omitted in whole or part, certain operations not shown in FIG. 14 may be added, and operations may be performed in a different order or performed in an alternate manner.

Figure 8:
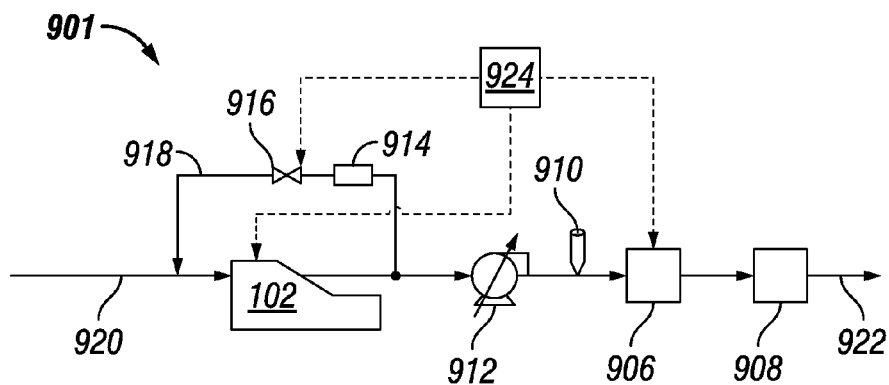
FIG. 8 is a schematic illustration of an alternate system for reducing $NO_x$ emissions.

FIG. 15 is a schematic flow diagram illustrating an alternate technique 800 for reducing $NO_x$ emissions. The technique 800 includes an operation 802 to interpret an engine load level for an engine 102 having at least one piston. The technique 800 further includes an operation 804 to determine whether the engine load level is less than a threshold percentage (40% in the example of FIG. 8) of a maximum engine load level. In certain embodiments the threshold percentage may be between about 30%-40%, but other values may be used that provide $NO_x$ generation benefit but minimize interference and fuel economy penalties that may be experienced if post-injection events are used for a large fraction of the total amount of fueling during heavily loaded engine operation. In response to determining the engine load level is less than 40% of a maximum engine load level, the technique 800 includes an operation 806 to perform a first fuel injection event before 10 degrees after TDC including 25% or less of a combustion fuel amount, a second fuel injection event after 10 degrees after TDC including 15% to 65% of the combustion fuel amount, and a third fuel injection event after the second fuel injection event and before 63 degrees after TDC including between 10% to 85% of the combustion fuel amount.

In response to determining the engine load level is equal to or greater than 40% of the maximum engine load level, the technique 800 includes an operation 808 to check whether a first injection scheme or second injection scheme is utilized. When the first injection scheme is utilized, the technique 800 includes an operation 810 to perform fuel injection using a fourth, fifth, and sixth fuel injection event instead of the first, second, and third fuel injection events; the fourth fuel injection event before 8 degrees after TDC including not more than 60% of the combustion fuel amount, the fifth fuel injection event after 10 degrees after TDC including 5% of 45% of the combustion fuel amount, and the sixth fuel injection event at least 3 degrees after the fifth fuel injection event and before 63 degrees after TDC including 5% to 55% of the combustion fuel amount. When the second injection scheme is utilized, the technique 800 includes an operation 812 to perform fuel injection using a fourth and fifth fuel injection event instead of the first, second, and third fuel injection events; the fourth fuel injection event before 10 degrees after TDC and including less than 60% of the combustion fuel amount, and the fifth fuel injection event after 10 degrees after TDC.

Certain operations of FIG. 15 may be omitted in whole or part, certain operations not shown in FIG. 15 may be added, and operations may be performed in a different order or performed in an alternate manner.

As is evident from the figures and text presented above, a variety of embodiments according to the present invention are contemplated.

One exemplary embodiment is a method including operations to determine whether an aftertreatment regeneration is active, to determine a combustion fuel amount for an internal combustion engine including reciprocating pistons, and to inject the combustion fuel amount within a combustion cycle such that over 50% of the combustion fuel amount is injected more than 10 degrees after TDC of the reciprocating pistons in response to the aftertreatment regeneration being active. The combustion fuel is combusted during the combustion cycle. In certain embodiments, injecting the combustion fuel amount includes performing a plurality of fuel injection events in the internal combustion engine, where each of the plurality of fuel injection events begin no later than 63 degrees after TDC.

In certain further embodiments, the method includes operations to determine an engine torque output request, and to adjust the combustion fuel amount based on the timing and fuel amounts of the plurality of fuel injection events such that the internal combustion engine achieves the engine torque output request.

In certain embodiments, the first fuel injection event occurs before 8 degrees after TDC, and each subsequent fuel injection event occurs not earlier than 3 crank angle degrees after each preceding fuel injection event. In certain further embodiments, each of the fuel injection events takes part in the actual combustion of the fuel.

In certain embodiments, the method includes operations to interpret an engine load level. In response to determining the engine load level is less than 40% of a maximum engine load level, the method further includes operations to perform a first fuel injection event before 8 degrees after TDC, a second fuel injection event after 10 degrees after TDC, and a third fuel injection event after the second fuel injection event. The first fuel injection event includes less than 25% of the combustion fuel amount, the second fuel injection event includes between 15% and 65% of the combustion fuel amount, and the third fuel injection event includes between 10% and 85% of the combustion fuel amount. In certain further embodiments, the engine load level includes one of an engine torque output request and an engine horsepower output request.

In certain further embodiments, the method includes operations, in response to determining the engine load level is at least equal to 40% of a maximum engine load level, to perform a first fuel injection event before 8 degrees after TDC, a second fuel injection event after 10 degrees after TDC, and a third fuel injection event after the second fuel injection event. The first fuel injection event includes less than 50% of the combustion fuel amount, the second fuel injection event includes between 5% and 45% of the combustion fuel amount, and the third fuel injection event includes between 5% and 55% of the combustion fuel amount.

In certain further embodiments, the method includes operations, in response to determining the engine load level is at least equal to 40% of a maximum engine load level, to perform a first fuel injection event before 10 degrees after TDC, and at least one post fuel injection event after 10 degrees after TDC. The first fuel injection event includes less than 50% of the combustion fuel amount, and the sum of fueling amounts from the post fuel injection events comprises over 50% of the combustion fuel amount.

In one exemplary embodiment, a method includes operations to interpret an engine load level for a reciprocating piston internal combustion engine, and in response to determining the engine load level is less than 40% of a maximum engine load level, to perform a first fuel injection event comprising less than 25% of a combustion fuel amount, the first fuel injection event occurring before 8 degrees after top dead center (TDC), to perform a second fuel injection event comprising between 15% and 65% of the combustion fuel amount, the second fuel injection event occurring after 10 degrees after TDC, and to perform a third fuel injection event comprising between 10% and 85% of the combustion fuel amount, the third fuel injection event occurring at least 3 degrees after the second injection event and before 63 degrees after TDC. In certain embodiments, the fuel injected in each fuel injection event takes part in the actual combustion of the fuel. In certain embodiments, each of the second and third fuel injection events follows the preceding fuel injection event by not less than 3 crank angle degrees and by not more than 2.8 milliseconds.

In certain further embodiments, the method includes operations, in response to determining the engine load level is at least equal to 40% of the maximum engine load level, to perform a fourth fuel injection event comprising not more than 50% of a combustion fuel amount, the fourth fuel injection event occurring before 8 degrees after top dead center (TDC), to perform a fifth fuel injection event comprising between 5% and 45% of the combustion fuel amount, the fifth fuel injection event occurring after 10 degrees after TDC, and to perform a sixth fuel injection event comprising between 5% and 55% of the combustion fuel amount, the sixth fuel injection event occurring at least 3 degrees after the fourth fuel injection event and before 63 degrees after TDC.

In certain further embodiments, the method includes operations, in response to determining the engine load level is at least equal to 40% of the maximum engine load level, to perform a fourth fuel injection event and a fifth fuel injection event, wherein the fourth fuel injection event comprises less than 50% of the combustion fuel amount and occurs before 10 degrees after TDC, and wherein the fifth fuel injection event occurs after 10 degrees after TDC.

In one exemplary embodiment, a system includes a reciprocating piston internal combustion engine, and a controller structured to interpret an engine load value, and to determine a first fuel combustion amount and a second fuel combustion amount in response to the engine load value. In certain embodiments, the first fuel combustion amount includes less than 50% of a combustion fuel amount, and the first fuel combustion amount and the second fuel combustion amount include a total amount of fuel contributing to combustion and injected within a single combustion stroke. In certain further embodiments, the system includes a fuel injection means that delivers the first fuel combustion amount before 10 degrees after TDC and injects the second fuel combustion amount after 10 degrees after TDC. In certain further embodiments, the fuel injection means includes a common rail fuel system, wherein the first fuel combustion amount is injected as at least one main fuel injection, and wherein the second fuel combustion amount is injected as at least one post fuel injection.

In certain further embodiments, the first fuel combustion amount includes less than 25% of the combustion fuel amount in response to the engine load value having a value less than 40% of a maximum engine load value. In certain further embodiments, the first fuel combustion amount includes less than 50% of the combustion fuel amount in response to the engine load value having a value at least equal to 40% of the maximum engine load value. In certain further embodiments, the last of the at least one post fuel injections begins before 63 degrees after TDC. In certain further embodiments, each fuel injection event after a first fuel injection event is performed not earlier than 3 crank angle degrees after a previous fuel injection event. In certain further embodiments, the controller is further structured to determine whether an aftertreatment regeneration is active, and to implement a standard fueling scheme in response to the aftertreatment regeneration not being active.

Another exemplary embodiment is a method including determining a desired engine outlet exhaust gas temperature, and in response to the desired engine outlet exhaust gas temperature, determining a variable geometry turbocharger (VGT) command and a fuel injection command having at least one post-injection event. The method further includes operating an internal combustion engine in response to the VGT command and the fuel injection command. An exemplary method further includes the desired engine outlet exhaust gas temperature being higher than an engine outlet exhaust gas temperature achieved by nominal operation of the internal combustion engine.

Further embodiments of the method include determining the VGT command and the fuel injection command further in response to determining an aftertreatment component regeneration event is active. A still further embodiment includes determining whether a smooth transition limit of the VGT is met. In response to the smooth transition limit of the VGT being met, the method includes providing an intake throttle command that reduces a fresh air flow amount into the internal combustion engine, and operating an intake throttle in response to the intake throttle command. A further embodiment includes providing the intake throttle command to reduce the fresh air flow amount into the internal combustion engine until an exhaust gas flow rate reaches a lower limit. Another exemplary method includes determining whether a smooth transition limit of the VGT is met, and in response to the smooth transition limit of the VGT being met, reforming an amount of fuel, and providing the reformed fuel products to the exhaust gas of the internal combustion engine.

Another embodiment includes, determining whether the desired engine outlet exhaust gas temperature is achievable. In response to determining the desired engine outlet exhaust gas temperature is not achievable, the method includes controlling a temperature of the aftertreatment component to a specified temperature. The specified temperature is a temperature lower than the desired engine outlet exhaust gas temperature, and higher than the engine outlet exhaust gas temperature achieved by nominal operation of the internal combustion engine.

In certain embodiments, determining the desired engine outlet exhaust gas temperature includes determining an optimal efficiency temperature for a selective catalytic reduction (SCR) catalyst. In certain embodiments, in response to the internal combustion engine being at a low loading condition, the method includes providing the fuel injection command as a first fuel injection amount that less than 25% of a total amount of fueling that is injected before 10 degrees after top-dead-center (DATDC) and a second fuel injection amount comprising the balance of combustion fuel injected after 10 DATDC. An exemplary method includes, in response to the internal combustion engine not being at a low loading condition, providing the fuel injection command as a first fuel injection amount that is less than 60% of a total amount of fueling that is injected before 10 DATDC.

Another exemplary embodiment is a method including determining a desired engine outlet exhaust gas temperature, an engine speed, and an engine load. The method includes, in response to the desired engine outlet exhaust gas temperature, the engine speed, and the engine load, determining an exhaust pressure increase command and a fuel injection command comprising at least one post-injection event. The method further includes operating an internal combustion engine in response to the exhaust pressure increase command and the fuel injection command. In certain embodiments, the method includes operating a variable geometry turbocharger (VGT) and/or an exhaust valve in response to the exhaust pressure increase command. An exemplary method includes determining a highly closed VGT command in response to the exhaust pressure increase command, a low engine speed, and a low engine load. Another exemplary method includes determining a highly open VGT command in response to the exhaust pressure increase command, and an engine speed that is at least a medium engine speed.

The exemplary method further includes providing an intake throttle command in response to the desired engine outlet exhaust gas temperature. A further embodiment includes bypassing at least a portion of an EGR stream around an EGR cooler in response to the desired engine outlet exhaust gas temperature.

In certain embodiments, the method includes determining whether a source for the desired engine outlet exhaust gas temperature is a DPF regeneration event or a selective catalytic reduction (SCR) catalyst temperature request. The method includes determining the exhaust pressure increase command and a fuel injection command further in response to the source for the desired engine outlet exhaust gas temperature. In certain embodiments, the source for the desired engine outlet exhaust gas temperature is the SCR catalyst temperature request, and the method further includes determining the desired engine outlet exhaust gas temperature as a target temperature for the exhaust gas. In certain embodiments, the source for the desired engine outlet exhaust gas temperature is the DPF regeneration event, and the method includes determining the desired engine outlet exhaust gas temperature as a minimum temperature for the exhaust gas.

An exemplary system includes an internal combustion engine producing an exhaust gas stream and an aftertreatment component that treats the exhaust gas stream, where the aftertreatment component includes a desired inlet exhaust gas temperature. The system includes an exhaust gas pressure device that modulates an exhaust pressure value and a fuel injection system that provides at least one post-injection event. The system includes a controller that provides an exhaust pressure command and a fuel injection command in response to determining that a temperature of the exhaust gas stream is lower than the desired inlet exhaust gas temperature. The exhaust gas pressure device is responsive to the exhaust pressure command and the fuel injection system is responsive to the fuel injection command.

The exemplary controller further determines an elevated temperature for the aftertreatment component in response to determining that the desired inlet exhaust gas temperature is not presently achievable, and provides the exhaust pressure command and the fuel injection command in response to the elevated temperature. The elevated temperature is lower than the desired inlet exhaust gas temperature and higher than a nominal operation temperature for the aftertreatment component. The controller further stops providing the exhaust pressure command and the fuel injection command in response to the desired inlet exhaust gas temperature being not achievable for a predetermined period of time. The exemplary controller further increases the predetermined period of time in response to determining that the internal combustion engine operates with a challenging duty cycle.

The exemplary system includes the exhaust gas pressure device being an exhaust throttle and/or a variable geometry turbocharger. The exemplary controller further provides an intake throttle command in response to determining the temperature of the exhaust gas stream is lower than the desired inlet exhaust gas temperature, and the system further includes an intake throttle responsive to the intake throttle command. In a further embodiment, the controller provides an exhaust gas recirculation (EGR) cooler bypass command in response to the determining the temperature of the exhaust gas stream is lower than the desired inlet exhaust gas temperature. The system further includes an EGR stream having an EGR cooler and an EGR cooler bypass, where the EGR cooler bypass is responsive to the EGR cooler bypass command. An exemplary system includes the aftertreatment component as an oxidation catalyst, a selective catalytic reduction catalyst, a particulate filter, and/or a catalyzed particulate filter.

An exemplary controller further provides a reforming command in response to determining that the temperature of the exhaust gas stream is lower than the desired inlet exhaust gas temperature. The system includes a fuel reformer that provides an amount of at least partially reformed fuel to the exhaust gas stream at a position upstream of the aftertreatment component, where the fuel reformer is responsive to the fuel reformer command. In a further embodiment, the fuel reformer further provide the amount of at least partially reformed fuel to the exhaust gas stream at a position upstream of an oxidation catalyst, where the aftertreatment component is downstream of the oxidation catalyst.

Another exemplary embodiment is a method including determining a desired inlet exhaust gas temperature for an aftertreatment component, and determining whether a current inlet temperature of the aftertreatment component is lower than the desired inlet exhaust gas temperature and whether the desired inlet exhaust gas temperature is achievable. The method further includes, in response to the current inlet temperature being lower than the desired inlet exhaust gas temperature and the desired inlet exhaust gas temperature being achievable, determining an exhaust pressure command and a fuel injection command. The method includes operating an exhaust gas pressure device in response to the exhaust pressure command, and operating a fuel system for an internal combustion engine in response to the fuel injection command.

An exemplary method further includes, in response to the desired inlet exhaust gas temperature being unachievable, providing a reforming command to lower the desired inlet exhaust gas temperature, and operating a fuel reformer in response to the reforming command. An exemplary operation of the fuel reformer includes providing an amount of $H_2$ and CO to a selective catalytic reduction catalyst, to an oxidation catalyst, and/or to a catalyzed particulate filter.

In certain embodiments, in response to the desired inlet exhaust gas temperature being unachievable, the method includes determining an elevated temperature, and providing the exhaust pressure command and the fuel injection command in response to the elevated temperature. The elevated temperature is achievable, lower than the desired inlet exhaust gas temperature, and higher than a nominal operation temperature for the aftertreatment component. The exemplary method further includes stopping the providing the exhaust gas pressure command and the fuel injection command in response to the desired inlet exhaust gas temperature being unachievable for a predetermined period of time.

An exemplary method includes providing an intake throttle command in response to the current inlet temperature being lower than the desired inlet exhaust gas temperature and the desired inlet exhaust gas temperature being achievable. The method includes operating an intake throttle in response to the intake throttle command. In a further embodiment, the method includes providing an EGR cooler bypass command in response to the current inlet temperature being lower than the desired inlet exhaust gas temperature and the desired inlet exhaust gas temperature being achievable. The method includes operating an EGR cooler bypass valve in response to the EGR cooler bypass command.

Yet another exemplary embodiment is a method including determining a desired inlet exhaust gas temperature for an aftertreatment component, and determining whether a current inlet temperature of the aftertreatment component is lower than the desired inlet exhaust gas temperature. The method further includes performing, in order, post-injection fueling in an internal combustion engine in response to the current inlet temperature of the aftertreatment component being lower than the desired inlet exhaust gas temperature, and adding an exhaust pressure increase to the post-injection fueling in response to the current inlet temperature of the aftertreatment component remaining lower than the desired inlet exhaust gas temperature.

In a further embodiment, the method includes adding an intake flow decrease with an intake throttle to the post-injection fueling and the exhaust pressure increase in response to current inlet temperature of the aftertreatment component remaining lower than the desired inlet exhaust gas temperature. In a still further embodiment, the method includes adding an EGR cooler bypass with an EGR cooler bypass valve to the post-injection fueling, exhaust pressure increase, and intake flow decrease, in response to current inlet temperature of the aftertreatment component remaining lower than the desired inlet exhaust gas temperature. In a yet further embodiment, the method includes lowering the desired inlet exhaust gas temperature to an elevated temperature in response to the current inlet temperature of the aftertreatment component remaining lower than the desired inlet exhaust gas temperature. The elevated temperature is lower than the desired inlet exhaust gas temperature, and higher than a nominal operation temperature for the aftertreatment component.

In certain embodiments, the method includes providing an amount of reformed fuel upstream of the aftertreatment component in response to determining the desired inlet exhaust gas temperature is unachievable. An exemplary method includes adding exhaust pressure increase by moving a variable geometry turbine to a highly closed position.

Yet another exemplary embodiment is a system, including an internal combustion engine having a common rail fuel system, an exhaust pressure modulation device for the internal combustion engine, and a controller structured to functionally execute certain operations to increase exhaust temperature and reduce NOx output of the engine. The controller determines a desired engine outlet exhaust temperature, an engine speed, and an engine load. In response to the desired engine outlet exhaust gas temperature, the engine speed, and the engine load, the controller determines an exhaust pressure increase command and a fuel injection command having at least one post-injection event. The common rail fuel system is responsive to the fuel injection command, and the exhaust pressure modulation device is responsive to the exhaust pressure increase command.

In certain embodiments, the exhaust pressure modulation device is a variable geometry turbocharger (VGT) and/or an exhaust throttle. An exemplary system includes the controller determining a highly closed VGT command in response to the exhaust pressure increase command, a low engine speed, and a low engine load. A still further exemplary system includes the controller determining a highly open VGT command in response to the exhaust pressure increase command, and an engine speed that is at least a medium engine speed. A further embodiment of the system includes an intake throttle, where the controller provides an intake throttle command in response to the desired engine outlet exhaust gas temperature. A still further embodiment of the system includes an exhaust gas recirculation (EGR) stream fluidly coupling an exhaust manifold of the engine to an intake manifold of the engine, an EGR cooler disposed in the EGR stream, and an EGR cooler bypass that bypasses a selectable portion of the EGR stream around the EGR cooler. The controller further provides an EGR bypass command in response to the desired engine outlet exhaust gas temperature, and the EGR cooler bypass is responsive to the EGR bypass command.

In certain embodiments, the system includes a diesel particulate filter (DPF) structured to treat the exhaust gas of the engine. The controller determines the desired engine outlet exhaust gas temperature as a minimum temperature for the exhaust gas in response to a source for the desired engine outlet exhaust gas temperature being a DPF regeneration event. In certain embodiments, the system includes a selective catalytic reduction (SCR) catalyst that treats the exhaust gas of the engine. The controller further determines the desired engine outlet exhaust gas temperature as a target temperature for the exhaust gas in response to a source for the desired engine outlet exhaust gas temperature being an SCR catalyst temperature request.

An exemplary embodiment for promoting rapid initiation of an aftertreatment component regeneration is described. The aftertreatment component treats the exhaust gas of an engine. A method includes determining that an aftertreatment regeneration event has commenced, is presently required, or is presently desirable. The method further includes determining that the aftertreatment regeneration event has stalled or been discontinued due to a lack of system capability to maintain the regeneration temperature. The method further includes performing temperature promoting activities of the system to maintain a temperature of the exhaust gas of the engine at an elevated level, where the elevated level is higher than a nominal level of the engine exhaust gas during nominal engine operations, but that his lower than the regeneration temperature. The method further includes discontinuing the temperature promoting activities after a predetermined period of time wherein the regeneration temperature is not achievable. Further embodiments of the method include determining that a duty cycle of an application including the engine is a challenging duty cycle, and in response to the challenging duty cycle beginning the temperature promoting activities at a lower aftertreatment regeneration need threshold, increasing the predetermined period of time, or otherwise lowering thresholds to engage the temperature promoting activities and increasing thresholds to disengage the temperature promoting activities.

An exemplary embodiment for promoting rapid warm-up of aftertreatment components, and/or for promoting low temperature operation of aftertreatment components is described. An exemplary system includes an aftertreatment component requiring a specified temperature or temperature range to operate efficiently and/or to achieve a regeneration of the component. An exemplary system further includes an oxidation catalyst and a hydrocarbon injection source upstream of the oxidation catalyst. Certain systems may not include an oxidation catalyst. The hydrocarbon injection source may be a fuel injector, and/or may include hydrocarbons introduced in an engine and exhausted to the oxidation catalyst.

The system further includes a variable geometry turbocharger (VGT), exhaust throttle, and/or an intake throttle usable to increase the temperature of the exhaust stream. The exemplary system further includes a fuel system on the engine capable of providing post-injection events. The exemplary system further includes a fuel reformer positioned between a fuel source and the aftertreatment component(s), where the fuel reformer is capable of providing $H_2$ and/or CO to the exhaust stream upstream of the aftertreatment component. The exemplary system further includes a burner, electrically resistive heater, or other direct heat application device.

The system further includes a controller structured to perform certain operations to support rapid warm-up and/or low temperature operation of the aftertreatment component. The exemplary controller determines that a rapid warm-up and/or low temperature operation is required for the aftertreatment component. The exemplary controller selects from the available temperature generating and/or low temperature assist devices available on the system. An exemplary controller co-ordinates the VGT, exhaust throttle, and/or intake throttle to rapidly generate temperature for the aftertreatment component. Another exemplary controller further provides post-injection events to rapidly warm-up the aftertreatment component.

Another exemplary controller provides reformed fuel products upstream of the aftertreatment component to promote low temperature operation of the aftertreatment component, and/or provides reformed fuel products to an oxidation catalyst upstream of the aftertreatment component to promote low temperature exothermic oxidation at the oxidation catalyst and rapidly warm-up the downstream aftertreatment component. Exemplary fuel reformers include gasoline-based, diesel-based, bio-diesel based, ethanol-based, methanol-based, and/or plasma based reformers. The fuel in the reformer may be of the same type used by the engine, or any other type readily available in the application, for example by an auxiliary generator or other device. The reformer may operate as a partial reformer, an autothermal reformer, and/or an electrolyzer. Another exemplary system includes an organic waste product source, and a Fischer-Tropsch process that provides reformed organic waste products to the exhaust stream. The exemplary system may be on a mobile or stationary application.

In certain embodiments, the controller selects a catalytic component and provides reformed fuel to the catalytic component to promote the catalytic activity. Exemplary catalytic components include an oxidation catalyst, a catalyzed particulate filter, and/or an SCR catalyst. The addition of CO and H2 to the exhaust stream for any of these devices has been shown to improve the catalyst activity at low temperatures. The controller determines that a low temperature condition is present and that catalytic activity is desired. The controller then provides the reformed fuel at a position in the exhaust stream that is upstream of the promoted catalyst. Exemplary operations of the controller include fast warm-up after an engine start or cold engine start, promotion of oxidation in the oxidation catalyst to assist on warm-up after engine start, or to achieve or maintain a regeneration temperature in the exhaust stream, promotion of oxidation in the oxidation catalyst to achieve an efficient $NO_x$ reduction temperature in a downstream SCR catalyst, promotion of oxidation in a particulate filter to achieve or maintain ongoing regeneration of soot in the filter, and/or promotion of activity in an SCR catalyst to maintain $NO_x$ reduction at an acceptable rate in the presence of a depressed operating temperature in the SCR catalyst.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred, especially, or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
    an internal combustion engine producing an exhaust gas stream;
    an aftertreatment component structured to treat the exhaust gas stream, the aftertreatment component having a desired inlet exhaust gas temperature;
    an exhaust gas pressure device structured to modulate an exhaust pressure value and a fuel injection system structured to provide at least one post-injection event;
    a controller structured to provide an exhaust pressure command and a fuel injection command in response to determining that a temperature of the exhaust gas stream is lower than the desired inlet exhaust gas temperature; and
    wherein the exhaust gas pressure device is responsive to the exhaust pressure command and wherein the fuel injection system is responsive to the fuel injection command.

2. The system of claim 1, wherein the controller is further structured to determine an elevated temperature for the aftertreatment component in response to determining that the desired inlet exhaust gas temperature is not presently achievable, and to provide the exhaust pressure command and the fuel injection command in response to the elevated temperature, wherein the elevated temperature is lower than the desired inlet exhaust gas temperature and higher than a nominal operation temperature for the aftertreatment component.

3. The system of claim 2, wherein the controller is further structured to stop providing the exhaust pressure command and the fuel injection command in response to the desired inlet exhaust gas temperature being not achievable for a predetermined period of time.

4. The system of claim 3, wherein the controller is further structured to increase the predetermined period of time in response to determining that the internal combustion engine operates with a challenging duty cycle.

5. The system of claim 1, wherein the exhaust gas pressure device comprises one of an exhaust throttle and a variable geometry turbocharger.

6. The system of claim 1, wherein the controller is further structured to provide an intake throttle command in response to the determining the temperature of the exhaust gas stream is lower than the desired inlet exhaust gas temperature, the system further comprising an intake throttle responsive to the intake throttle command.

7. The system of claim 6, wherein the controller is further structured to provide an exhaust gas recirculation (EGR) cooler bypass command in response to the determining the temperature of the exhaust gas stream is lower than the desired inlet exhaust gas temperature, the system further comprising an EGR stream having an EGR cooler and an EGR cooler bypass, wherein the EGR cooler bypass is responsive to the EGR cooler bypass command.

8. The system of claim 1, wherein the aftertreatment component comprises an aftertreatment component selected from the components consisting of: an oxidation catalyst, a selective catalytic reduction catalyst, a particulate filter, and a catalyzed particulate filter.

9. The system of claim 1, wherein the controller further provides a reforming command in response to the determining that the temperature of the exhaust gas stream is lower than the desired inlet exhaust gas temperature, and wherein the system further comprises a fuel reformer structured to provide an amount of at least partially reformed fuel to the exhaust gas stream at a position upstream of the aftertreatment component, wherein the fuel reformer is responsive to the fuel reformer command.

10. The system of claim 9, wherein the fuel reformer is further structured to provide the amount of at least partially reformed fuel to the exhaust gas stream at a position upstream of an oxidation catalyst, wherein the aftertreatment component is downstream of the oxidation catalyst.

11. A method, comprising:
determining a desired inlet exhaust gas temperature for an aftertreatment component;
determining whether a current inlet temperature of the aftertreatment component is lower than the desired inlet exhaust gas temperature, and whether the desired inlet exhaust gas temperature is achievable;
in response to the current inlet temperature being lower than the desired inlet exhaust gas temperature and the desired inlet exhaust gas temperature being achievable, determining an exhaust pressure command and a fuel injection command; and
operating an exhaust gas pressure device in response to the exhaust pressure command, and operating a fuel system for an internal combustion engine in response to the fuel injection command.

12. The method of claim 11, further comprising, in response to the desired inlet exhaust gas temperature being unachievable, providing a reforming command to lower the desired inlet exhaust gas temperature, and operating a fuel reformer in response to the reforming command.

13. The method of claim 12, wherein the operating the fuel reformer comprises providing an amount of $H_2$ and CO to a selective catalytic reduction catalyst.

14. The method of claim 12, wherein the operating the fuel reformer comprises providing an amount of $H_2$ and CO to an oxidation catalyst.

15. The method of claim 12, wherein the operating the fuel reformer comprises providing an amount of $H_2$ and CO to a catalyzed particulate filter.

16. The method of claim 11, further comprising, in response to the desired inlet exhaust gas temperature being unachievable, determining an elevated temperature, and providing the exhaust pressure command and the fuel injection command in response to the elevated temperature, wherein the elevated temperature is achievable, lower than the desired inlet exhaust gas temperature, and higher than a nominal operation temperature for the aftertreatment component.

17. The method of claim 16, further comprising stopping the providing the exhaust gas pressure command and the fuel injection command in response to the desired inlet exhaust gas temperature being unachievable for a predetermined period of time.

18. The method of claim 11, further comprising providing an intake throttle command in response to the current inlet temperature being lower than the desired inlet exhaust gas temperature and the desired inlet exhaust gas temperature being achievable, and operating an intake throttle in response to the intake throttle command.

19. The method of claim 18, further comprising providing an EGR cooler bypass command in response to the current inlet temperature being lower than the desired inlet exhaust gas temperature and the desired inlet exhaust gas temperature being achievable, and operating an EGR cooler bypass valve in response to the EGR cooler bypass command.

20. A method, comprising:
determining a desired inlet exhaust gas temperature for an aftertreatment component;
determining whether a current inlet temperature of the aftertreatment component is lower than the desired inlet exhaust gas temperature;
performing, in order:
post-injection fueling in an internal combustion engine in response to the current inlet temperature of the aftertreatment component being lower than the desired inlet exhaust gas temperature; and
adding exhaust pressure increase to the post-injection fueling in response to the current inlet temperature of the aftertreatment component remaining lower than the desired inlet exhaust gas temperature.

21. The method of claim 20, further comprising adding an intake flow decrease with an intake throttle to the post-injection fueling and the exhaust pressure increase in response to current inlet temperature of the aftertreatment component remaining lower than the desired inlet exhaust gas temperature.

22. The method of claim 21, further comprising adding an EGR cooler bypass with an EGR cooler bypass valve to the post-injection fueling, exhaust pressure increase, and intake flow decrease, in response to current inlet temperature of the aftertreatment component remaining lower than the desired inlet exhaust gas temperature.

23. The method of claim 22, further comprising lowering the desired inlet exhaust gas temperature to an elevated temperature in response to the current inlet temperature of the aftertreatment component remaining lower than the desired inlet exhaust gas temperature, wherein the elevated temperature is lower than the desired inlet exhaust gas temperature, and higher than a nominal operation temperature for the aftertreatment component.

24. The method of claim 20, further comprising providing an amount of reformed fuel upstream of the aftertreatment component in response to determining the desired inlet exhaust gas temperature is unachievable.

25. The method of claim 20, wherein adding exhaust pressure increase comprises moving a variable geometry turbine to a highly closed position.

* * * * *